(12) United States Patent
Nandy et al.

(10) Patent No.: US 7,636,318 B2
(45) Date of Patent: Dec. 22, 2009

(54) REAL-TIME NETWORK ANALYZER

(75) Inventors: Biswajit Nandy, Kanata (CA); Nabil Seddigh, Kanata (CA); Rupinder Singh Makkar, Kanata (CA); Peter Steven Pieda, Kanata (CA)

(73) Assignee: Solana Networks Inc., Ottawa, Ontario (CA)

( * ) Notice: Subject to any disclaimer, the term of this patent is extended or adjusted under 35 U.S.C. 154(b) by 350 days.

(21) Appl. No.: 11/606,877

(22) Filed: Dec. 1, 2006

(65) Prior Publication Data

US 2007/0147271 A1 Jun. 28, 2007

Related U.S. Application Data

(60) Provisional application No. 60/753,393, filed on Dec. 27, 2005.

(51) Int. Cl.
*H04J 1/16* (2006.01)
(52) U.S. Cl. ............. 370/242; 370/400; 379/221.15
(58) Field of Classification Search ........... 370/464, 370/498, 503, 252, 241–251, 389, 400; 455/39, 455/67.11, 403, 422.1, 423, 424; 715/733–739; 379/219, 221.15
See application file for complete search history.

(56) References Cited

U.S. PATENT DOCUMENTS

| | | | | |
|---|---|---|---|---|
| 6,330,601 | B1* | 12/2001 | French et al. | 709/223 |
| 6,339,488 | B1* | 1/2002 | Beshai et al. | 398/59 |
| 6,526,044 | B1* | 2/2003 | Cookmeyer et al. | 370/352 |
| 7,395,497 | B1* | 7/2008 | Chaulk et al. | 715/200 |
| 2003/0112958 | A1* | 6/2003 | Beaudoin et al. | 379/221.15 |
| 2005/0041684 | A1* | 2/2005 | Reynolds et al. | 370/463 |
| 2005/0243738 | A1* | 11/2005 | Zolfaghari | 370/254 |
| 2005/0286512 | A1* | 12/2005 | Mahamuni et al. | 370/389 |
| 2007/0058631 | A1* | 3/2007 | Mortier et al. | 370/392 |
| 2007/0076628 | A1* | 4/2007 | Li et al. | 370/254 |

OTHER PUBLICATIONS

"An OSPF Topology Server: Design and Evaluation" by Aman Shaikh, Mukul Goyal, Albert Greenberg, Raju Rajan, K.K. Ramakrishnan, IEEE Journal on Selected Area in Communications (JSAC) vol. 20, No. 4, May 2002.
"OSPF Monitoring: Architecture, Design and Deployment Experience" by Aman Shaikh and Albert Greenberg, Porc. USENIX Symposium on Networked Systems Design and Implementation (NSDI), Mar. 2004.
"Topology Discovery for Public IPv6 Networks" by Daniel G. Waddington, Fangzhe Chang et al, ACM SIGCOMM Computer Communications Review, vol. 33, No. 3, Jul. 2003.
"Discovering Internet Topology" by R. Siamwalla, R. Sharma and S. Keshav, submitted to IEEE INFOCOMM'99.
Tobi Oetiker's MRTG—The Multi-Router Traffic Grapher, http://oss.oetiker.ch/mrtg Retrieved on Nov. 30, 2006, but inventors admit that this reference has been in existence prior to the present invention.

* cited by examiner

*Primary Examiner*—Steven H Nguyen
*Assistant Examiner*—Obaidul Huq
(74) *Attorney, Agent, or Firm*—Victoria Donnelly; IP-MEX, Inc.

(57) ABSTRACT

A real-time network-analysis system comprises a network appliance and a plurality of management devices. The network appliance continuously monitors an object network and synthesizes a current network image comprising contemporaneous indicators of connectivity, occupancy, and performance of the object network. A management-client device may gain access to the network image for timely control and for use in producing long-term network-evolution plans. To enable the creation of a real-time network image, optimized topology synthesis algorithms are devised to minimize the computational effort. The real-time network-analysis system is adapted for use with an object network employing a variety of routing protocols, such as link-state protocols, and network-management protocols, such as the Simple-Network-Management protocol.

7 Claims, 19 Drawing Sheets

| Input | Output |
|---|---|
| Traffic load<br>Routing Protocol<br>Connectivity<br>Acceptable Performance<br>Constraints | Required Links' Capacities |

1820

| Input | Output |
|---|---|
| Traffic load<br>Routing Protocol<br>Connectivity<br>Links' Capacities | Performance |

1810

*FIG. 18*

REAL-TIME NETWORK ANALYZER

RELATED APPLICATIONS

The present patent application claims priority from the U.S. provisional patent application Ser. No. 60/753,393 to Nandy et al. entitled "A METHOD AND SYSTEM FOR MONITORING, TROUBLESHOOTING, DIAGNOSTIC AND PLANNING IN IP NETWORKS" filed on Dec. 27, 2005, which is incorporated herein by reference.

FIELD OF THE INVENTION

The present invention relates to network monitoring and analysis. In particular, it is directed to a system for real-time topology discovery, network visualization, and traffic analysis.

BACKGROUND OF THE INVENTION

Modern Society has grown to be heavily dependent on telecommunications and, hence, intolerant to service degradation or temporary service disruption. Telecommunications networks are dynamic systems that need be adapted to accommodate temporal and spatial variation of traffic demand. The increasing versatility of network-elements motivates structural changes and the introduction of new services which, in turn, influence the volume and distribution of traffic.

In its simplest form, a telecommunications network comprises nodes interconnected by links. A node may be a traditional switching node handling rigid connections, a packet router handling irregular packet streams, or a versatile router-switch handling both connections and irregular packet streams. A node may support a large number of traffic sources and sinks and due to the typical non-uniformity of source-sink traffic patterns the placement of nodes is a major network-design consideration. The nodal layout and inter-nodal connectivity have a significant effect on the efficiency, reliability, and overall performance of a network.

An accurate image of a network's layout is of paramount importance in resolving service disruption as well as in planning network enhancement. The layout of a rapidly changing network is difficult to determine by manual means. As the number of nodes increases, the number of alternative inter-nodal connection patterns increases rendering network-design rather challenging. Detecting, diagnosing and correcting localized malfunctions also become more intricate as the number of interconnected nodes increases.

In addition to real-time control, there is a need for a comprehensive and efficient network design and provisioning system. Conventional network-planning systems are semi-automated, fragmented, strenuous, and inefficient, and may not be adequate for modern fast-changing networks. Over the past four decades, analytical network design models had been developed and mechanized in software tools. Such tools rely heavily on acquisition of accurate traffic-demand data, which can be determined from operational measurements provided at the switching nodes. For provisioning an existing network, a description of a current-connectivity of the network is needed. The traffic-demand data, together with the current network-connectivity data, specified routing rules, and objective performance indices are used to determine the need, or otherwise, of new links or link-capacity changes. With the fast pace of modern-network evolution, the network-planning process need be revisited.

There is therefore a need for effective automated means for real-time network monitoring and analysis to expedite diagnostics and trouble-shooting and, hence, ensure service quality and continuity. Such means may also be exploited to influence long-term network structure and operation.

SUMMARY OF THE INVENTION

The present invention provides a network-analysis system for an object telecommunications network comprising a plurality of interconnected network elements. The network-analysis system collects and analyzes data in real time and comprises a network appliance and a plurality of management clients. The network appliance may have dedicated access to at least one network element of the object network. Alternatively, a topologically or physically remote network appliance may access the object network through another network, for example, through a generic routing encapsulation tunnel (GRE tunnel).

The network-analysis system employs algorithms for constructing a connectivity image, based on acquisition of data related to standard link-state protocols, and mapping link-occupancy data acquired from standard network-management protocols on the connectivity image. The algorithms also map information acquired from proprietary tools onto the connectivity image. The link-state protocols include the Open-Shortest-Path-First (OSPF) protocol and the Intermediate-System-to-Intermediate-System (ISIS) protocol. The standard network-management protocols include the Simple Network-Management Protocol (SNMP). The proprietary tools may include the Netflow system or any data exchange with an Intrusion-Detection System (IDS).

The network-analysis system includes means for topology synthesis and network visualization to produce a visualized network model. The visualized network model forms a basis for interpreting collected data to produce network diagnostics and troubleshooting instructions. Additionally, the visualized network model may be used for network-planning functions based on condensing collected data and mapping the condensed data on the visualized network model.

In accordance with an aspect, the present invention provides a method for real-time analysis of an object network having a plurality of nodes interconnected by a plurality of links. The method comprises steps of: acquiring link-capacity data and protocol data from the object network, the protocol data comprising link-state data, link-utilization data, and performance data; and synthesizing an integrated network image from the protocol data, the integrated network image comprising a connectivity image, an occupancy image, and a performance image.

The step of synthesizing includes using link-state data to determine the connectivity image, using both the link-utilization data and link-capacity data to determine the occupancy image, and using the performance data to determine the performance image. The connectivity image indicates a current view of nodal interconnection, the occupancy image includes an occupancy indicator for each link, and the performance image includes a performance indicator for each link or for each node-pair in the object network. The performance image may also include global metrics such as a mean value of data-loss or a mean value of link-access delay for the entire object network.

Synthesizing the integrated network image comprises a process of mapping the occupancy image and the performance image on the connectivity image. Preferably, the link-capacity data is superimposed on the connectivity data in order to gauge the effect of a link-failure incident.

Acquiring the protocol data may be realized by continuously receiving protocol data units, ascertaining a purpose of each protocol data unit, and performing an action specified by the each protocol data unit.

In accordance with another aspect, the present invention provides a system for analyzing an object network having a plurality of nodes interconnected by a plurality of links. The system comprises a network appliance and a plurality of management clients communicatively coupled to the network appliance for monitoring the object network. The network appliance comprises: a module for acquiring link-capacity data and protocol data from the object network, the protocol data comprising link-state data, link-utilization data, and performance data; a medium for storing software program instructions for processing the protocol data; and a module using the program instructions for synthesizing an integrated current network image from the link-capacity data and the protocol data. The current network image comprises contemporaneous connectivity indicators, occupancy indicators, and performance indicators of the object network. At least one of the management clients comprises a visualization module for graphically presenting the current topology image and a status-reporting module for presenting alarm and diagnostic data. The current topology image may cover the entire object network or a part thereof.

The network appliance may connect to the object network in a variety of ways. The network appliance may connect to any of the nodes through a direct link or through a tunnel within an external network. The network appliance may connect to more than one node of the object network. Alternatively, the network appliance may be embedded within one of the nodes of the object network. A management client may connect to the network appliance through a dedicated link or through an external network.

The network appliance may have means for receiving and storing static data including a link-cost index for each link in the plurality of links and a capacity limit for the each link for use in sizing the object network. The network appliance may use the link-cost indices and rules of a predefined routing protocol to compute paths from each node to each other node through the object network.

The system may also include a resident planning module, operated in an analysis mode or a synthesis mode, for use by a network administrator for influencing operational and topological changes of the object network. The resident planning module comprises a scenario generator for generating network-image variants. In the analysis mode, the resident planning module employs a first analytical model for analyzing the network-image variants for projected traffic loads. In the synthesis mode, the resident planning module employs a second analytical model for sizing the object network according to the network-image variants for projected traffic loads.

In accordance with a further aspect, the present invention provides a network appliance for an object network having a plurality of nodes interconnected by a plurality of links and employing at least one routing protocol and at least one network-management protocol. The network appliance comprises: a network-interface module for acquiring current protocol data from the object network; a data manager for organizing and pre-processing the current protocol data; and a microscopic-analysis module for processing the current protocol data to produce a current network image. The current network image comprises contemporaneous connectivity indicators, occupancy indicators, and performance indicators of the object network. The microscopic analyzer is the central component of the network appliance.

The data manager comprises: a short-term data handler for organizing the current protocol data to produce structured current data; a data filter coupled to the short-term data handler for filtering the current data to produce aggregated data, and a long-term data handler for organizing the aggregated data to produce structured aggregated data.

The network appliance also comprises a macroscopic-analysis module for processing the aggregated data to produce network-planning information. The network-interface module comprises: a protocol engine for executing the at least one routing protocol; an external data handler for acquiring network information provided by protocols used in the object network, other than the at least one network-management protocol; a network-management engine for retrieval of operational data from the plurality of nodes using the at least one network-management protocol; and a probe engine for measuring network performance.

The network appliance further comprises a communications module for receiving requests from a plurality of network-management clients and sending responses to the network-management clients.

The microscopic analyzer of the present invention may be realized according to one of two configurations. According to the first configuration, the microscopic analyzer comprises: a topology-synthesis module for synthesizing a network image from the current protocol data; a monitoring module for detecting link-state changes including link failure and link recovery; and a fault-diagnostics module for determining a cause of a link failure. According to the second configuration, the microscopic analyzer comprises: a connectivity-image module for determining the connectivity indicators; a performance-tracking module for determining the performance indicators; an occupancy-tracking module for determining the occupancy indicators; an alarm and diagnostics module computationally coupled to the connectivity-image module and the performance-tracking module for receiving alarms transmitted by the nodes of the object network and determining causes for the alarms; and a network-characterization module computationally coupled to the performance module and the occupancy-tracking module for determining metrics of the object network.

In accordance with a further aspect, the present invention provides a resident planning module communicatively coupled to an object network having a plurality of nodes interconnected by links. The planning module comprises a scenario generator and a network-modeling unit. The scenario generator is operable to receive external static connectivity, link-capacity matrix, and user-specified traffic-load projections, and prepares input to the network-modeling unit, which computes corresponding network performance. The traffic-load projections may be derived by manipulating current traffic-load data received from the nodes of the object network.

In accordance with another aspect, the present invention provides a resident planning module communicatively coupled to an object network, the object network having a plurality of nodes interconnected by links. The planning module comprises a scenario generator and a network-modeling unit. The scenario generator is operable to receive external static-connectivity data, existing link-capacity data, user-specified traffic-load projections, user-specified performance objectives, and prepares input to the network-modeling unit which computes link-capacity requirements, including new links, for consideration in network provisioning.

In accordance with a further aspect, the present invention provides a method of verifying a network-modeling unit communicatively coupled to an object network having a plurality of nodes interconnected by links. The method comprises steps of: receiving a static connectivity matrix, routing rules, a current connectivity image and a link-occupancy image; determining, at the network-modeling unit, a link-occupancy matrix; comparing the link-occupancy matrix with the link-occupancy image, and computing a first precision index of the network-modeling unit based on deviation of the link-occupancy matrix from the link-occupancy image.

In accordance with another aspect, the present invention provides a method of verifying a network-modeling unit communicatively coupled to an object network having a plurality of nodes interconnected by links. The method comprises steps of: receiving a static connectivity matrix, routing rules, a current connectivity image and network-performance measurements; determining, at the network-modeling unit, computed performance estimates; comparing the performance estimates with the network-performance measurements, and computing a second precision index based on deviation of the performance estimates from corresponding computed performance estimates. The network-performance measurements and computed performance estimates may comprise an access-delay metric or an end-to-end delay metric for each link of the object network.

BRIEF DESCRIPTION OF THE DRAWINGS

Embodiments of the present invention will be further described with reference to the accompanying exemplary drawings, in which:

FIG. 18 illustrates features of a resident planning module associate with the management client of FIG. 16.

DETAILED DESCRIPTION OF EMBODIMENTS OF THE INVENTION

Terminology

Figure 1:
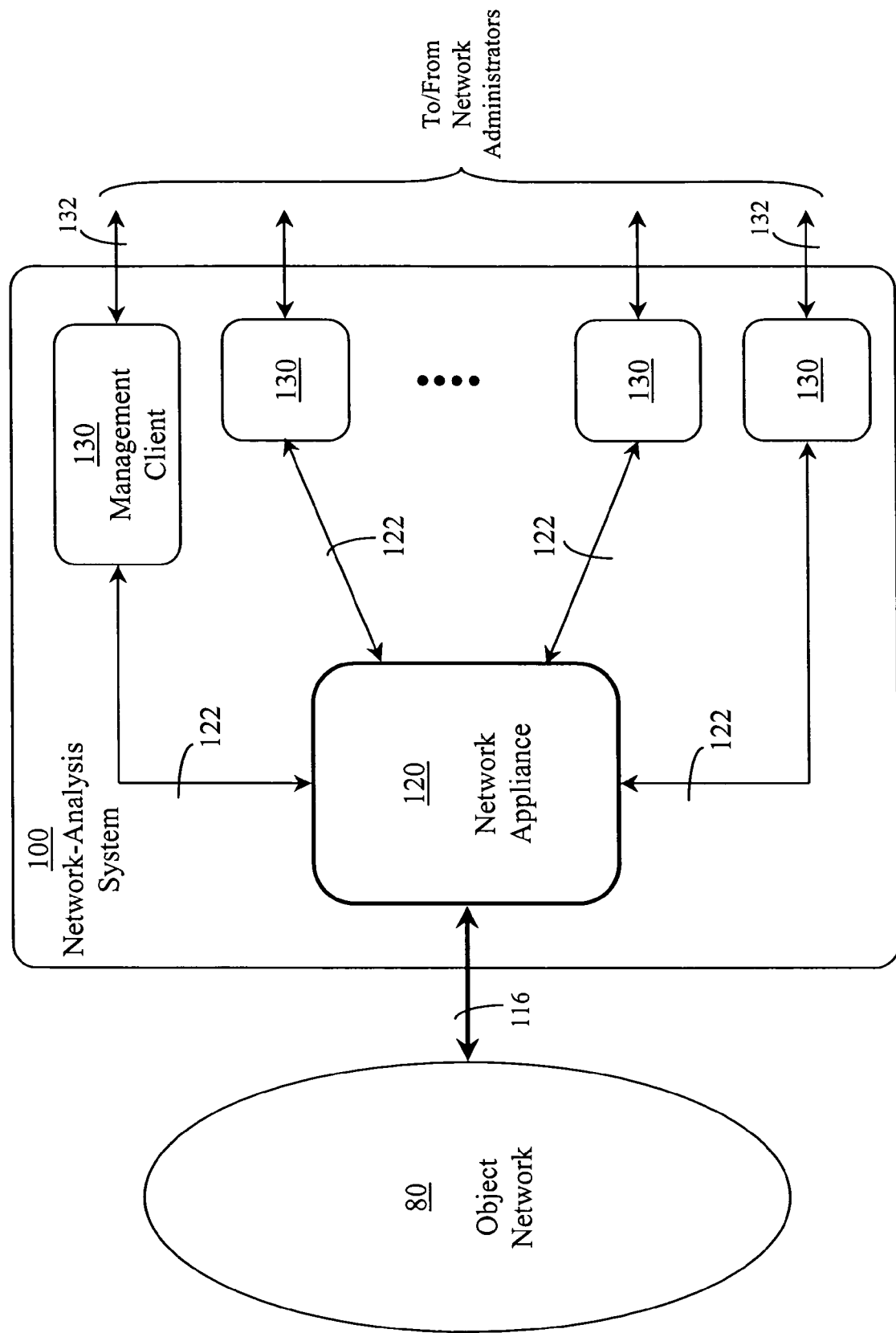
FIG. 1 illustrates an object network employing a network-analysis system comprising a network appliance connected to the object network and at least one management client, in accordance with an embodiment of the present invention.

Link State: The state of a link is an indication of whether the link is functioning at full capacity, functioning at a reduced capacity, or completely out of order. A link may be a dual (two-directional) link carrying signals from a first node to a second node, and vice versa, or one-directional carrying signals from the first node to the second node or vice versa.

Link capacity: The physical capacity of a link is the maximum data flow rate, preferably expressed in bits per second, which can be transported by the link. The traffic capacity of a link is the mean value of the data flow rate that can be sustained without violating predefined performance objectives. The traffic-capacity of a link is less than its physical capacity and is typically determined according to traffic characteristics and acceptable delay variation.

Link occupancy: The occupancy of a link is determined as the mean data flow rate divided by the physical capacity of the link.

Link-performance: Link-performance is a measure of data loss or delay at an interface between a node and a link.

Node-pair Performance: Node-pair performance is a measure of loss or delay of data originating from a data source connecting to a first node and destined to a data sink connecting to a second node.

Network Topology: The layout of network nodes and their interconnection by links constitute the network's topology.

Operational Data: Data indicating link utilization and performance are generally referenced as operational data.

Object Network: It is a specific network monitored and analyzed by the system of the present invention. An object network may be an "Autonomous System" in an IP-based network, a "Virtual Private Network" formed within a shared network, or any other network employing proprietary protocols.

Connectivity image: A connectivity image is a data structure holding data indicating operating links in an object network. The data structure may also have fields for indicating deviation of operating link capacity from corresponding installed capacity. The data structure may have the form of a simple matrix or a multi-threaded linked list.

Occupancy image: An occupancy image of a network is a data structure holding data indicating the traffic occupancy of each link. The traffic occupancy naturally fluctuates with time and is therefore quantified by some parametric representation, such as a mean value over selected time intervals.

Performance image: A performance image of a network is a data structure holding performance metrics for links or node pairs.

Mapping: A first characterization of a network is mapped onto a second characterization of the network by collating information from the first characterization and second characterization for each network component, such as a node or a link. The first characterization and second characterization may be encoded using entirely different data structures.

Superimposing: It is a special (and simpler) form of mapping requiring only simple pairing of information related to each network component of interest.

Network image: A network image is an integrated image comprising a connectivity image complemented by mapping an occupancy image and/or a performance image.

Visualization: The term visualization as used herein refers to a process of encoding a network image, as defined above, in a form insightful to a human receiver.

Communicative coupling: Two or more network devices are said to be "communicatively coupled" if they share a communication channel or exchange signals through communication channels.

Computational coupling: Two or more software modules are said to be "computationally coupled" if they share a data-storage medium or if the output of one module is processed by another of the two or more software modules.

Link-cost index: A link-cost index is metric used for selecting paths through a network. The link cost may be proportional to the length of a link or the propagation delay along the link, and may be affected by other factors such as the type of transmission medium. The link-cost indices used in the apparatus of the present invention may be the same link-cost indices used by the object network. However, for scenario evaluation, other link-cost indices may be introduced to examine their effect and possibly influence the routing scheme of the object network.

Access port/inner port: The object network comprises nodes each having a plurality of dual ports (a dual port comprises an input port and an output port). The ports of a node may be divided into access ports and innerports. Each access port interfaces with data sources/sinks or with an external node (outside the object network). The inner ports of a node connect to links directed to inner ports of other nodes within the object network.

Network Monitoring and Analysis

FIG. 1 illustrates a real-time network analyzer, referenced as real-time network-analysis system 100, for monitoring, analyzing, controlling, and planning an object network 80 in accordance with embodiments of the present invention. Object network 80 has a plurality of nodes and a plurality of internal links interconnecting the nodes (not illustrated). Each node has inner ports interfacing with links directed to other nodes in the object network. A node may also have access ports interfacing with external nodes or data sources and sinks. An inner port or access port may be an input port, an output port, or a dual input-output port. The network-analysis system 100 comprises a "network appliance" 120 (also called network-monitoring device 120) connecting to a dual access port of object network 80 to monitor the object network 80 with a minimum of intrusion, and a plurality of "management clients" 130 each connecting to the network appliance 120. A management client 130 may connect directly or through an access network to the network appliance 120. Network appliance 120 may process a variety of protocols, which provide information characterizing the object network. Each management client 130 has a dual communication channel 132 for user interface which may be on a host machine running a Management-Client Application.

The object network employs a specific routing protocol for transferring data from a traffic source connecting to an ingress port of a node to a traffic sink connected to an egress port of any other node. Object network 80 may also employ a specific management protocol for tracking network occupancy and performance. The specific routing protocol or the specific network-management protocol employed in object network 80 may provide up-to-date inter-nodal-connectivity information. The object network may employ more than one routing protocol and more than one network-management protocol that can provide network-state data to the network appliance 120.

Figure 2:
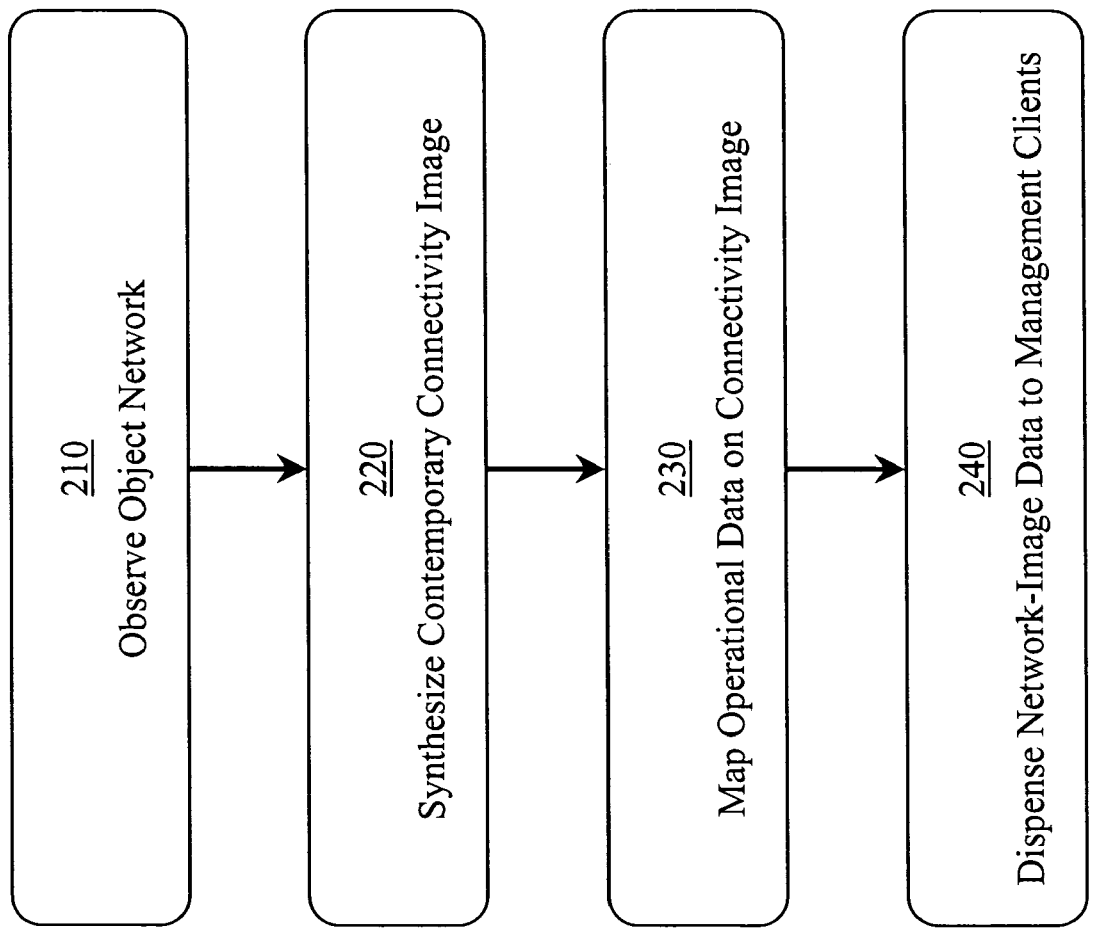
FIG. 2 illustrates a method of real-time network-analysis in accordance with an embodiment of the present invention.

FIG. 2 illustrates the underlying method of operating the network-analysis system 100. The method comprises four basic processes. In a process 210, the object network is observed to acquire data related to network connectivity as well as operational data such as link occupancy, traffic performance, and any other observable or measurable characteristic. Network connectivity may change due to planned installation or removal of nodes or links. Network connectivity may also vary with time due to localized outage incidents and subsequent recovery. A second process 220 uses the acquired time-varying connectivity data to synthesize a network image to enable visualization and analysis of the object network. In a third process 230, the occupancy or performance data acquired in process 210 are mapped on the network connectivity image developed in process 220 to yield an operational image. In a fourth process 240, the results obtained in process 230 are made available to the management clients 130 either on a demand basis or through broadcasting.

Figure 3:
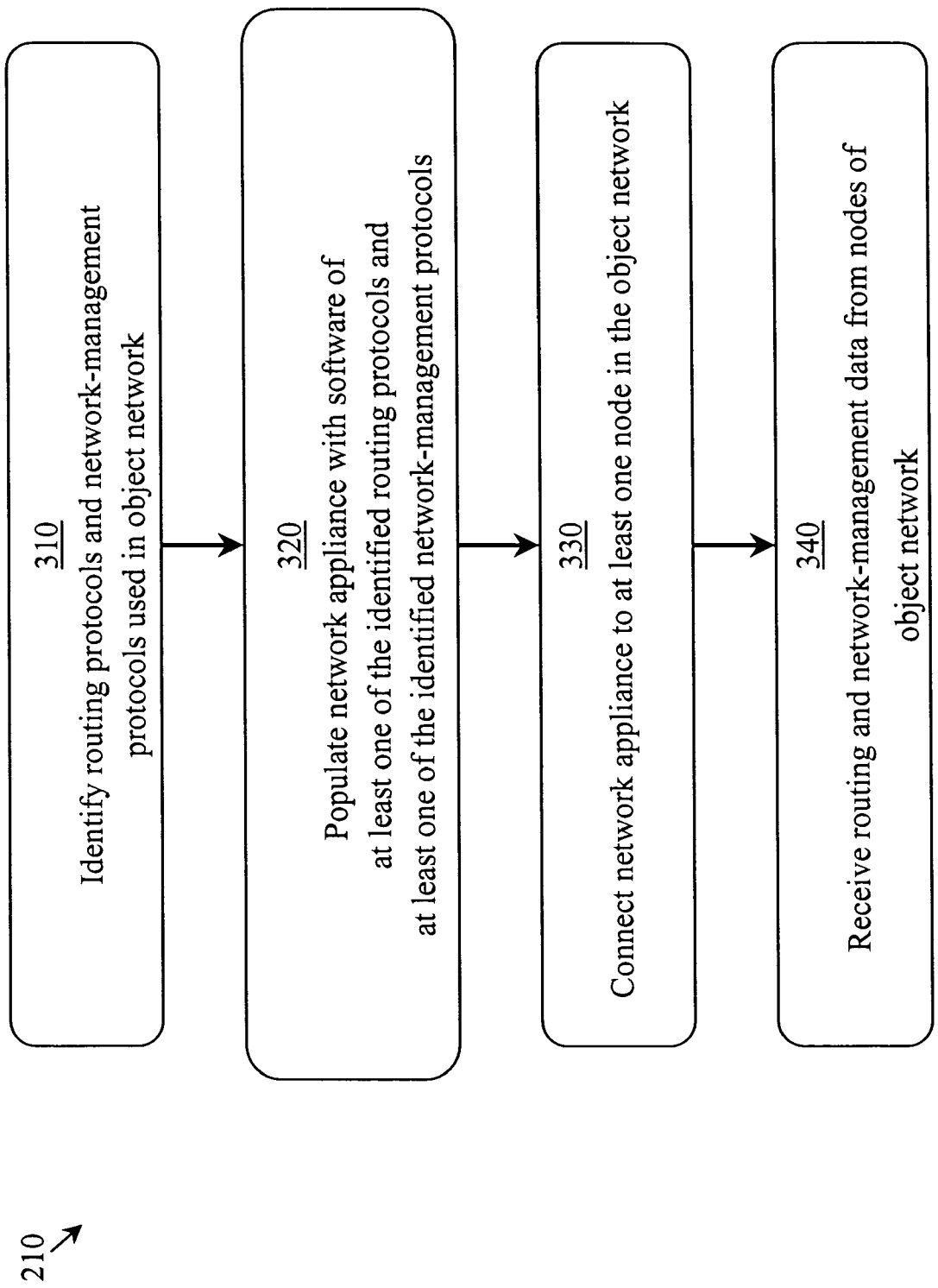
FIG. 3 illustrates a process of observing the object network of FIG. 1 in accordance with an embodiment of the present invention.

FIG. 3 further illustrates steps of the observation process 210 of FIG. 2. In order to acquire network information embedded in the protocols employed in object network 80, the network appliance 120 subscribes to the object network 80 as an ordinary—though passive—node. To do so, the routing protocols and any network-management protocols employed in the object network are identified (step 310). This may be performed by a network administrator or by some automated means. The network appliance 120 is populated with appropriate software to exercise the identified protocols (step 320). Network appliance 120 is then connected to at least one node in the object network 80 (step 330) and operated to receive protocol data of the identified protocols (step 340).

The observation process 210 is heavily dependent on the routing protocol employed by the object network 80. With a routing protocol based on dissemination (broadcasting) of link states, such as the "Open-Shortest-Path-First" (OSPF) protocol or the "intermediate-System-to-Intermediate System" (ISIS) protocol, the network appliance 120 may receive link-state-advertisements (LSAs) and analyze their content to produce an image of the topology of the object network 80.

Integrated View of Contemporaneous Link States

Telecommunication networks have traditionally been managed and provisioned based on operational measurements such as traffic load, link occupancy, link blocking, end-to-end blocking, delay variation, etc. A typical network node is adapted to measure its own traffic load and performance. The measurements, taken independently by the network nodes, may be analyzed by manual or automated means to determine the network's overall performance and identify the need for structural or operational changes, if any. The network links are traffic-coupled; a typical traffic stream may traverse several nodes and several links.

Therefore, the occupancy, and consequently the performance, of a link may be highly correlated with the occupancy (and performance) of another link even if the two links are not connected to a common node. Therefore, the availability of records of contemporaneous link states may facilitate network analysis and enhance network provisioning. A major shortcoming of conventional network measurements systems is their inability to capture records of contemporaneous nodal and link states.

The network-analysis system 100 of the present invention creates a real-time network image, which may be used to significantly improve several aspects of network management, including short-term corrective measures and long-term network-design improvement. Network-analysis system 100 captures and time-tamps simultaneous network measurements, thus providing an integrated view of the network states exhibiting the inter-dependence of link-occupancy states.

Functional Description of the Network-Analysis System

Figure 4:
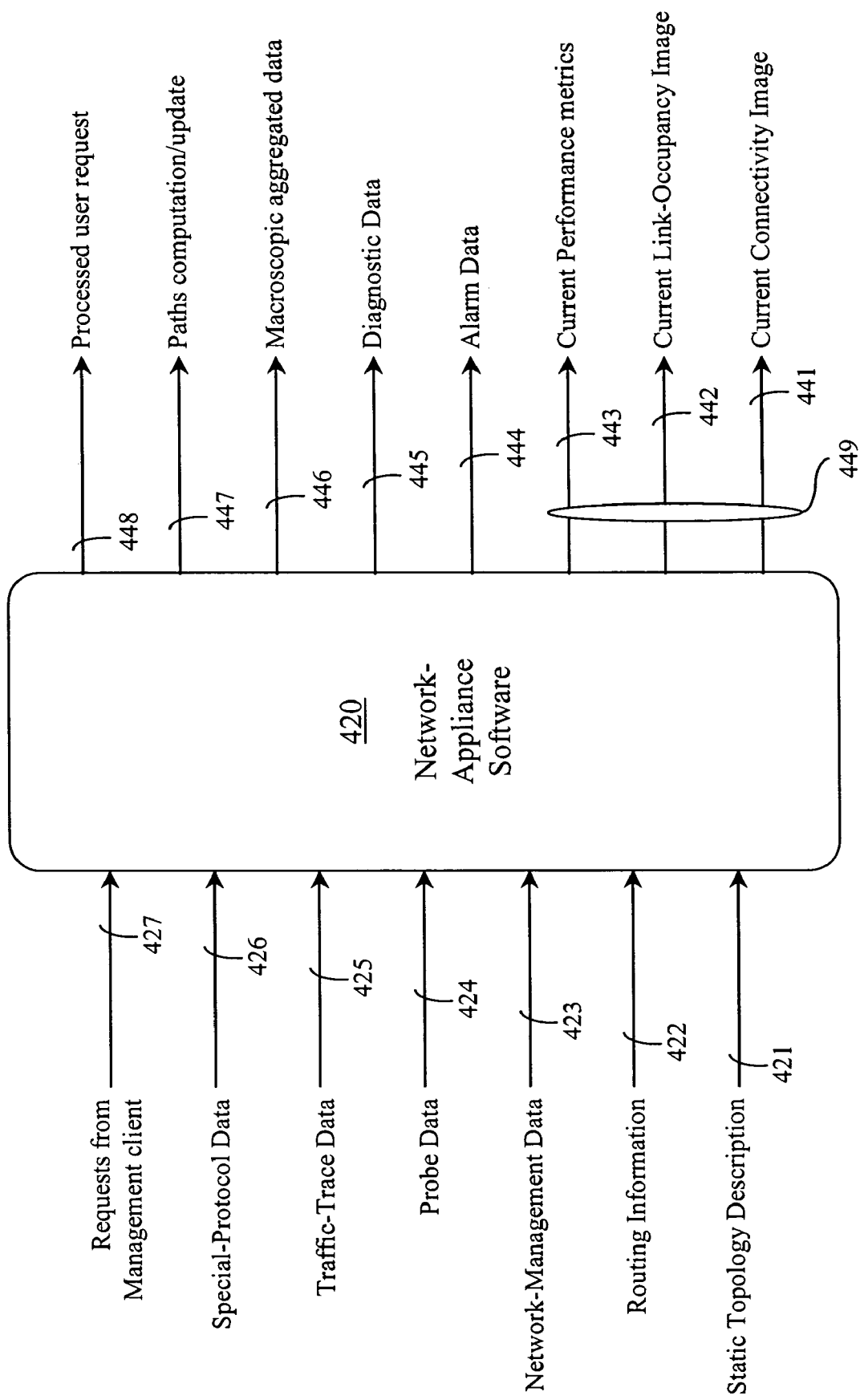
FIG. 4 illustrates functional inputs and outputs of the network appliance of the network-analysis system of FIG. 1.

The main components of the network-analysis system 100 are the network appliance 120 and the management clients 130. The network appliance 120 may receive both static network descriptors and time varying network data from various sources. The received data may be analyzed to construct a coherent "real-time" network view for service-quality control. The network appliance may also filter the real-time data to determine parameters that characterize the object network for use in long-term management and provisioning. As illustrated in FIG. 4, the inputs processed by the network-appliance software 420 include a static topology description (421), routing information (422) related to the routing protocol(s) employed in the object network, network-management data (423) obtained from protocols such as the SNMP, probe data (424) indicating, for example, source-destination delay variation, traffic-trace data (425) including parametric traffic descriptors as well as records indicating flow-rate fluctuations along some or all of the links of the object network, and special-protocol data (426) obtained by means of proprietary non-standard protocols. The network appliance receives requests (427) from management clients 130. The requests may relate to topology issues or attributes of particular interfaces. The output of the network appliance may include a network connectivity image 449 which may include a current connectivity image 441, a current link-occupancy image 442, and current performance metrics 443. The output may also include alarm data (444) and diagnostic data (445). The network appliance 120 may also determine metrics of long-term interest, which, together with macroscopic aggregated data (446) may be used for planning purposes. The nodes of the object network may individually compute and update their own routing tables. However, an administrator of an object network may opt to let the network appliance 120, which has all the needed data, perform the task of computing a complete set of routing tables to be distributed to respective nodes (output 447 of network-appliance software 420). The network appliance may send raw network data as well as computed network-image data (output 448) to a management client 130 in response to requests 427.

Figure 5:
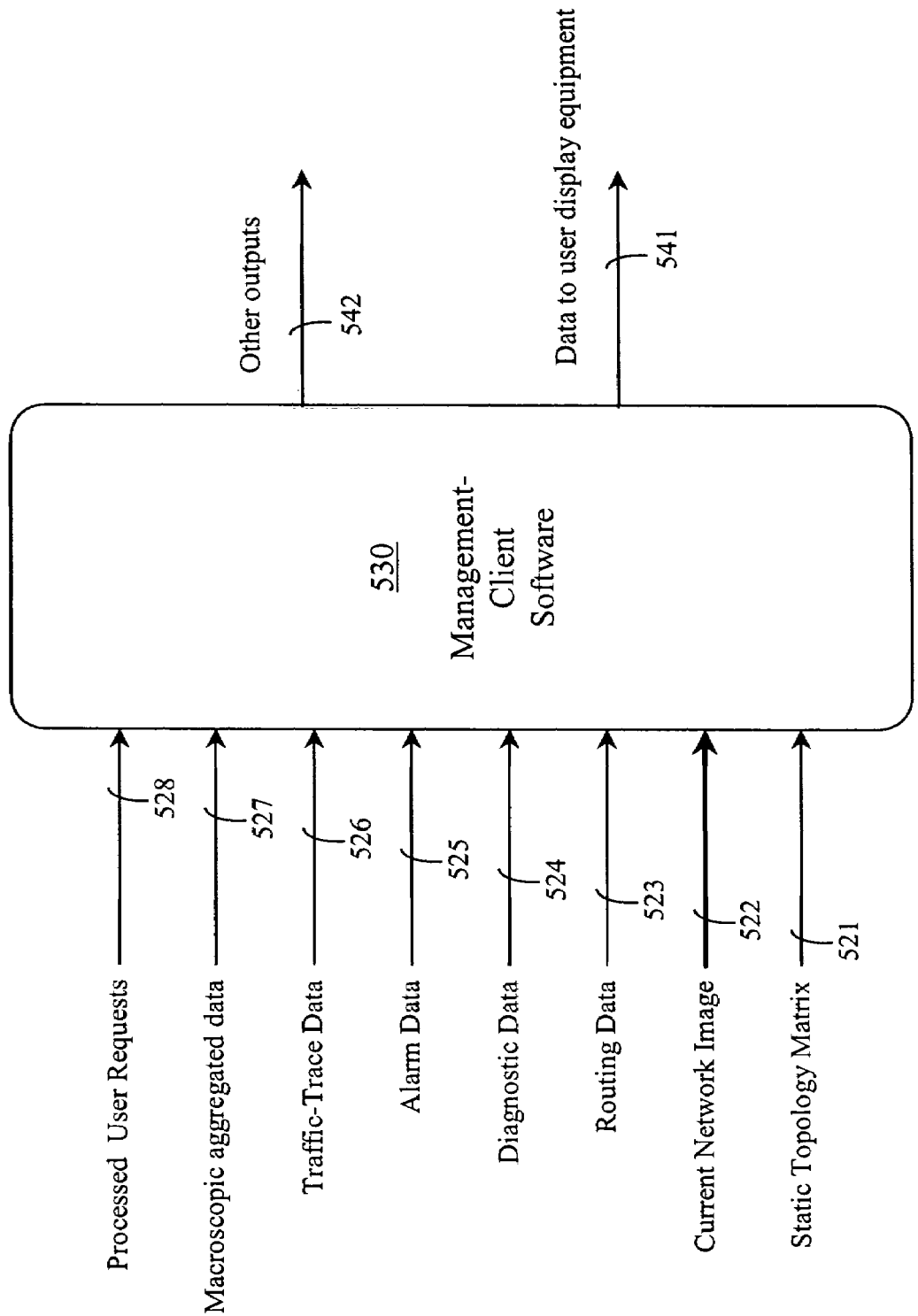
FIG. 5 illustrates functional inputs and outputs of a management client in the network-analysis system of FIG. 1.

A management client 130 may receive some, or all, of inputs 521 to 528, as illustrated in FIG. 5, from the network appliance to be processed by the management-client software 530 and produce data 541 for driving a display terminal for visual examination by a user. Other outputs 542 may be tailored to facilitate further processing in external computing facilities.

Figure 6:
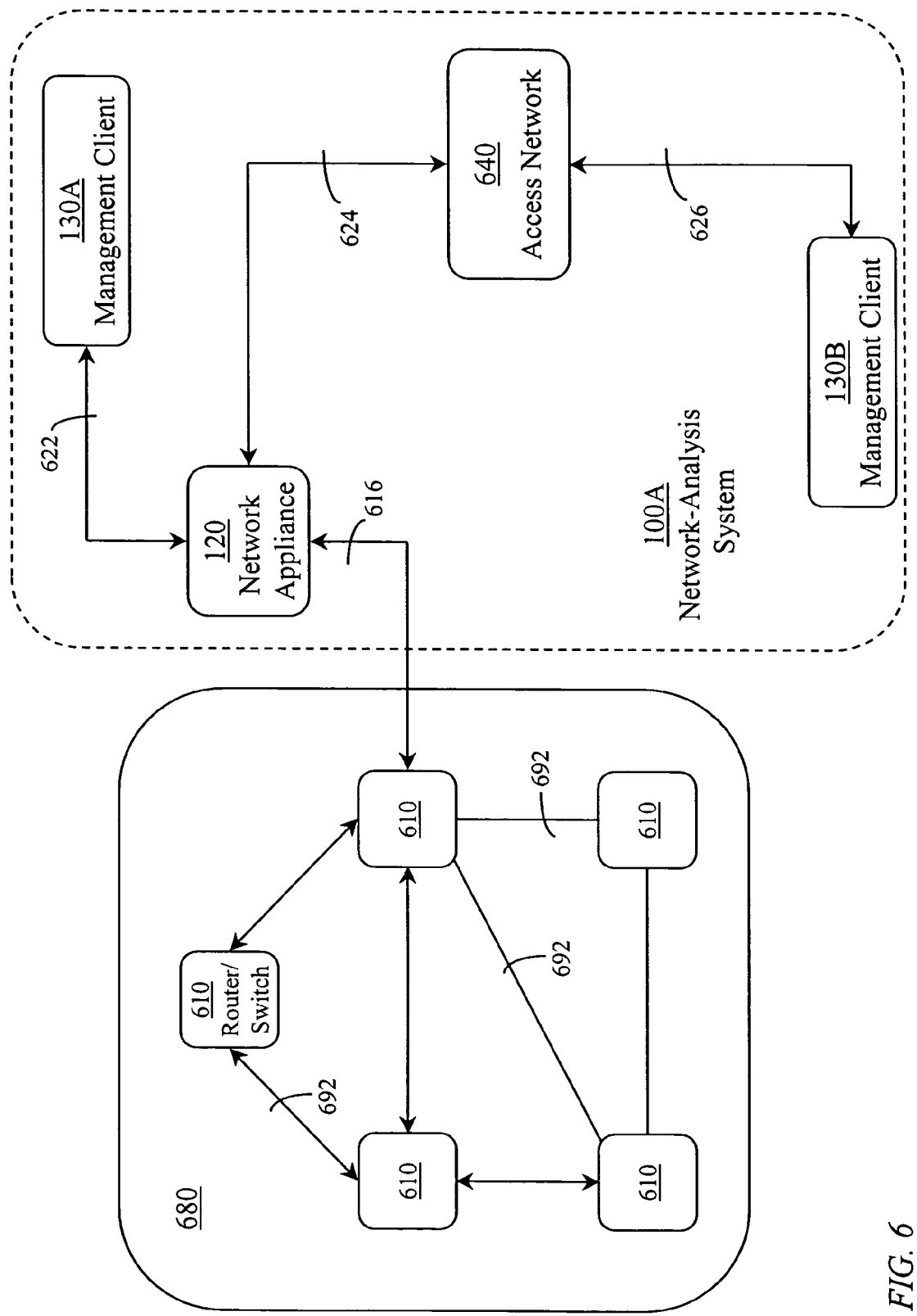
FIG. 6 illustrates an exemplary object network employing a network-analysis system comprising a network appliance directly connected to a node of the object network, a first management client directly connected to the network appliance, and a second management client connected to the network appliance through an access network, in accordance with an embodiment of the present invention.

FIG. 6 illustrates an exemplary object network 680 comprising five nodes 610 interconnected through links 692. A node 610 may be a switching device, a routing device, or a combined router-switch accommodating both connection-based and "connectionless" data. The nodes 610 may be of different dimensions and capacities. In one application, all the nodes 610 support at least one common routing protocol, and each node 610 is provided with network-management software to enable sharing network-state data with other nodes 610 or with external network-monitoring devices. In another application, some nodes may employ a first routing protocol and the remaining nodes employ a second protocol, with selected nodes adapted to process the first protocol and the second protocol. The disclosed methods and apparatus of the present invention are applicable to an object network 80 (680) employing multiple co-existing routing protocols.

The network-analysis system 100A associated with exemplary object network 680 comprises a network appliance 120, a first management client 130A, connected directly to network appliance 120, and a second remote management client 130B connected through an access network 640. Management client 130A connects to the network appliance 120 through a dedicated dual channel 622 while management client 130B connects to the network appliance 120 through a dual channel 626, a dual path traversing an access network 640, and a dual channel 624 from the access network 640 to the network appliance 120. The network appliance 120 may pose as an adjacent node to any of the network nodes 610 or may be embedded within one of the nodes 610 as will be described below.

Figure 7:
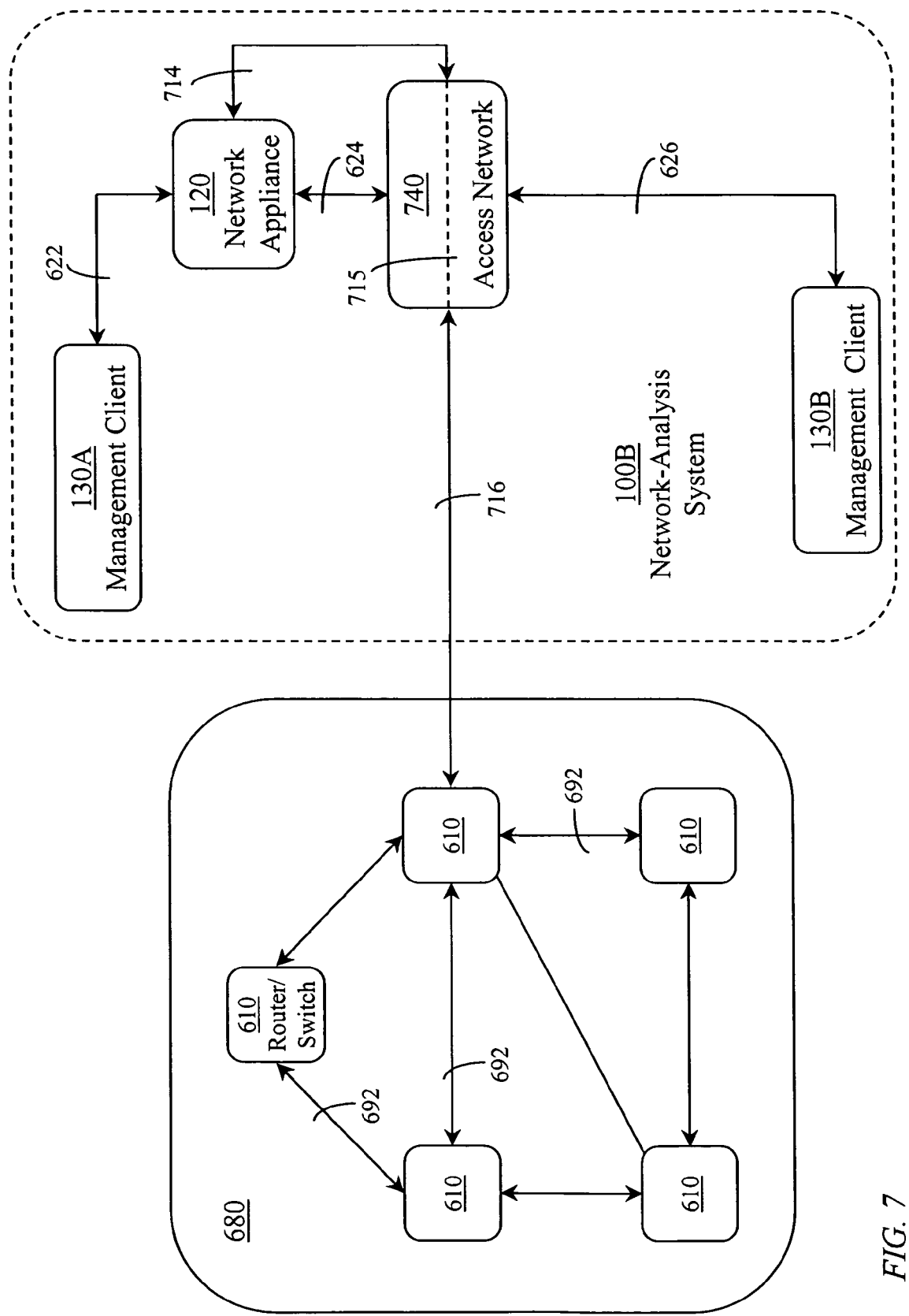
FIG. 7 illustrates an exemplary object network employing a network-analysis system comprising a remote network appliance connected to a node of the object network, a first management client directly connected to the network appliance, and a second management client connected to the network appliance through an access network, in accordance with an embodiment of the present invention.

The network appliance 120 may be directly connected to a selected node 610 (FIG. 6) or connected to the selected node 610 through a dedicated path traversing the access network 640 (or any other access network). In FIG. 7, the network appliance 120 connects to a selected node 610 through a dual channel 714, a "tunnel" 715 through access network 740, and a dual channel 716 from the access network 740 to the selected node 610. In an alternate configuration, the remote network appliance 120 may access the object network 680 through an access network other than access network 740 used by remote management client 130B to access the network appliance 120.

Although exemplary object network 680 comprises five nodes 610, it is understood that the object network may comprise a larger number of nodes. The object network may provide wide-area coverage or global coverage. A network appliance associated with an object network comprising a large number of nodes, over 100 nodes for example, may have adjacency to multiple nodes of the object network for load sharing and to reduce the acquisition time of network-state data.

Adjacent Versus Embedded Network Appliance

Figure 8:
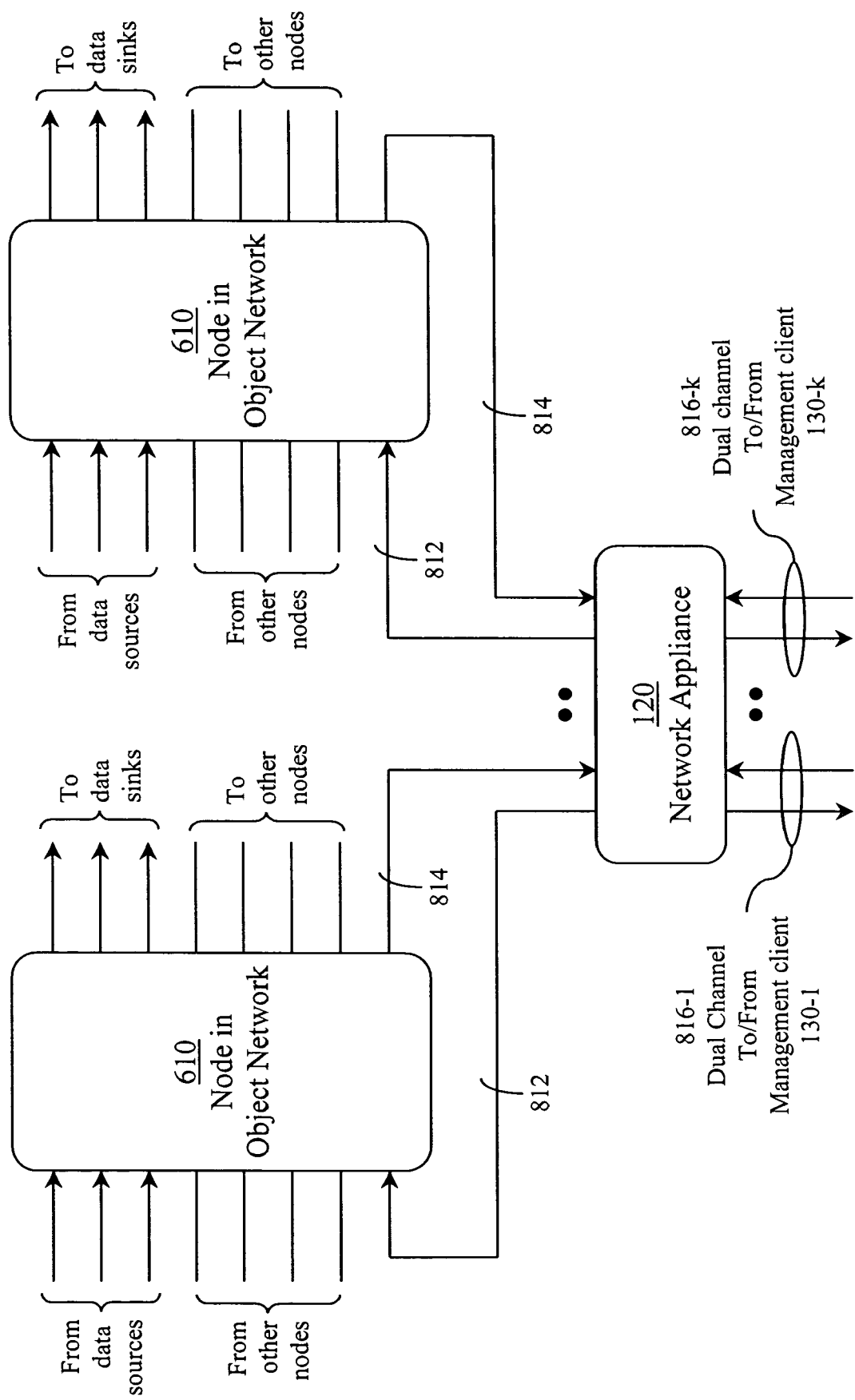
FIG. 8 illustrates a network appliance connecting to at least two nodes in the object network of FIG. 6 or FIG. 7, the network appliance having a network address, in accordance with an embodiment of the present invention.

In a link-state network, i.e., a network in which each node distributes information on states of its links to adjacent nodes, each node eventually receives the link states of each other node. Each node uses the link-state information it receives to compute a routing table comprising a complete or partial identification of a route from the node to each other node of interest. According to one embodiment, illustrated in FIG. 8, the network appliance 120 may be treated as a node in the object network 80 (680) and, hence, given a network address. The network appliance 120 may then connect to at least one node in the object network and is herein referenced as an "adjacent network appliance". In the configuration of FIG. 8, network appliance 120 connects to each of selected nodes 610 through a dual channel 812/814, and connects to each of k≧1 management clients 130-1 . . . 130-k, through a dual channel 816 (816-1, . . . , 816-k). In an Internet-Protocol-based network (IP-based network), the network appliance 120 would be given an IP address. Thus, the network appliance 120 can receive link-states of each other node in the object network. The network appliance does not necessarily need to communicate directly with each other node in the object network and, hence, may not compute identifiers of routes to the other nodes. However, unlike the (ordinary) nodes of network 80 (680), the network appliance may compute a complete set of routing tables, including a routing table for each node in the object network, as well as a routing table from the network appliance to the nodes of the object network. The network appliance may then transmit the routing tables to respective network nodes, which would then be exempt from computing their own routing tables. Subsequently, routing-table-changes caused by link-state changes, due to failure or recovery from failure for example, may be transmitted to respective nodes.

Figure 9:
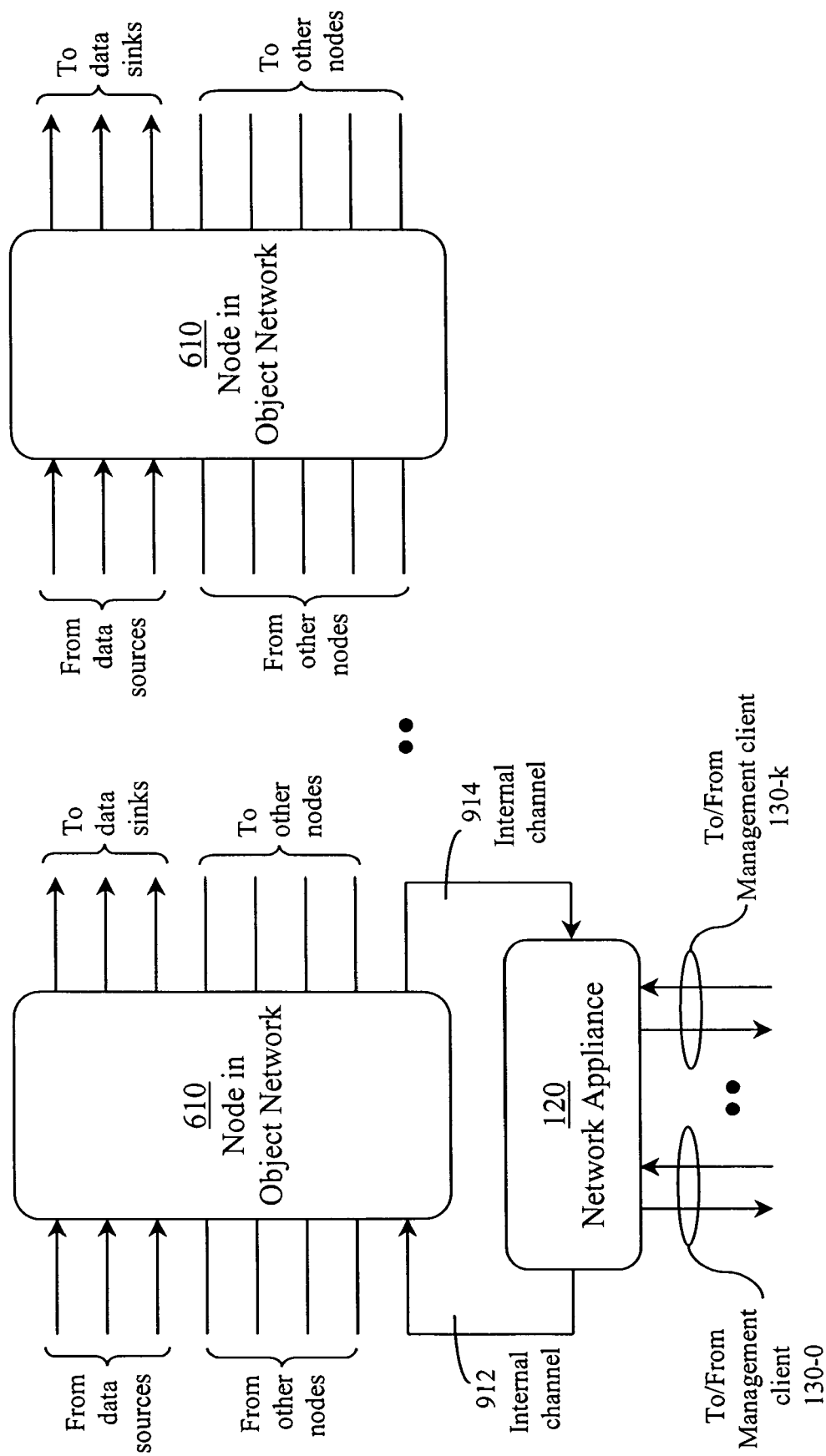
FIG. 9 illustrates a network appliance embedded within one of the nodes of the object network of FIG. 6, in accordance with an embodiment of the present invention.

In an alternative embodiment, illustrated in FIG. 9, the network appliance 120 may be embedded within a specific node 610 from among the nodes of the object network 680 and, hence, the network appliance would have the same address of the specific node. In the configuration of FIG. 9, network appliance 120 is collocated with a selected node 610 and connects to a dual port of the selected node 610 through a dual internal channel 912/914. The embedded network appliance may still receive protocol data units from each other node 610 in the object network. The main limitation of an embedded network appliance is that it can acquire network information through only one node 610 while an adjacent network appliance may have several interfaces to acquire network data from multiple adjacent nodes 610 as will be described with reference to FIG. 19.

Network Appliance Structure

Figure 10:
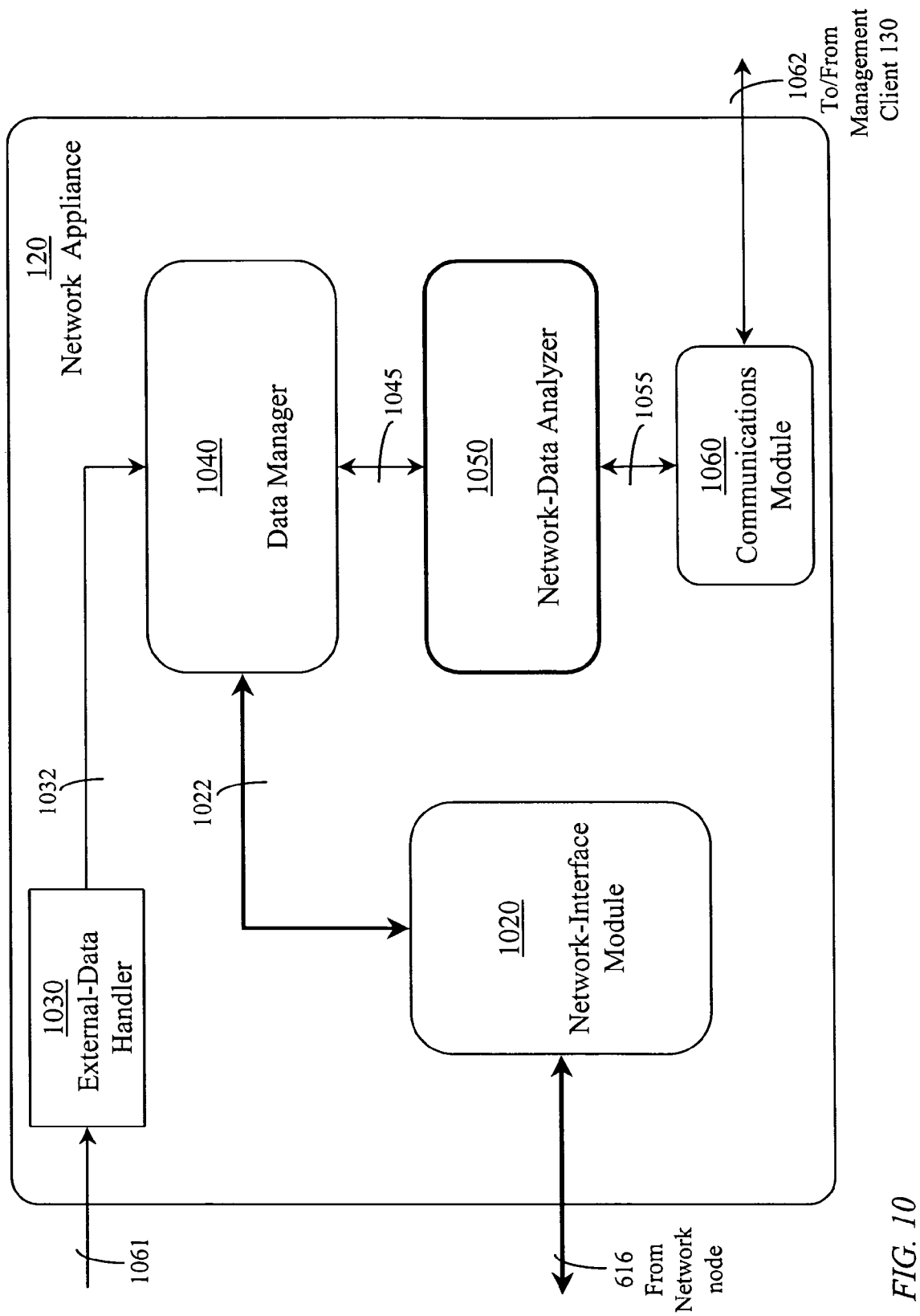
FIG. 10 illustrates an exemplary network appliance for use in the network-analysis system of FIG. 1 comprising a network-interface module, a data manager, a network-data analyzer, an external-data handler, and a communications module in accordance with an embodiment of the present invention.

FIG. 10 illustrates the main components of the network appliance 120 which include a network interface module 1020 connecting to a network data manager 1040 through a multi-channel link 1022, an external-data handler 1030 receiving object-network data through a link 1061 and connecting to the data manager 1040 through a channel 1032, a network-data analyzer 1050 exchanging data with the data manager 1040 through a dual link 1045, and a communications module 1060 coupled to the network-data analyzer 1050 by a dual link 1055, which may include multiple channels. Communications module 1060 has a dual path 1062 to each management client (corresponding to direct dual channel 622 or compound path 626/624 of the configurations of FIG. 6 and FIG. 7). The network-interface module 1020 exchanges data with an adjacent node 610 through the dual direct channel 616 in the configuration of FIG. 6 or through path 714/715/716 in the configuration of FIG. 7. The exchanged data may include protocol data units and data related to link state and utilization. The protocol data units acquired at network interface module 1020 generally relate to commonly used protocols such as the "Open-Shortest-Path-First" protocol or the "intermediate-System-to-Intermediate System" protocol, often referenced by the acronyms OSPF and ISIS, respectively. The external-data handler 1030 may acquire network data from tools such as the Multi-Router Traffic Grapher (MRTG), which monitors various network devices in an object network adapted to implement SNMP such as object network 80 of FIG. 1, and indicates the flow rate (in bits-per-second, for example) of traffic traversing any network interface. Alternatives to MRTG may be devised for monitoring an object network 80 implementing network-management protocols other than SNMP.

The network-data manager 1040 pre-processes control data to facilitate further processing in the network-data analyzer 1050. The network-data analyzer 1050 provides both microscopic analysis of real-time data, for use in real-time decisions, and macroscopic analysis for use in delayed decisions related to network-planning. The communications module 1060 handles two-way communications between the network appliance 120 and at least one management client 130.

Figure 11:
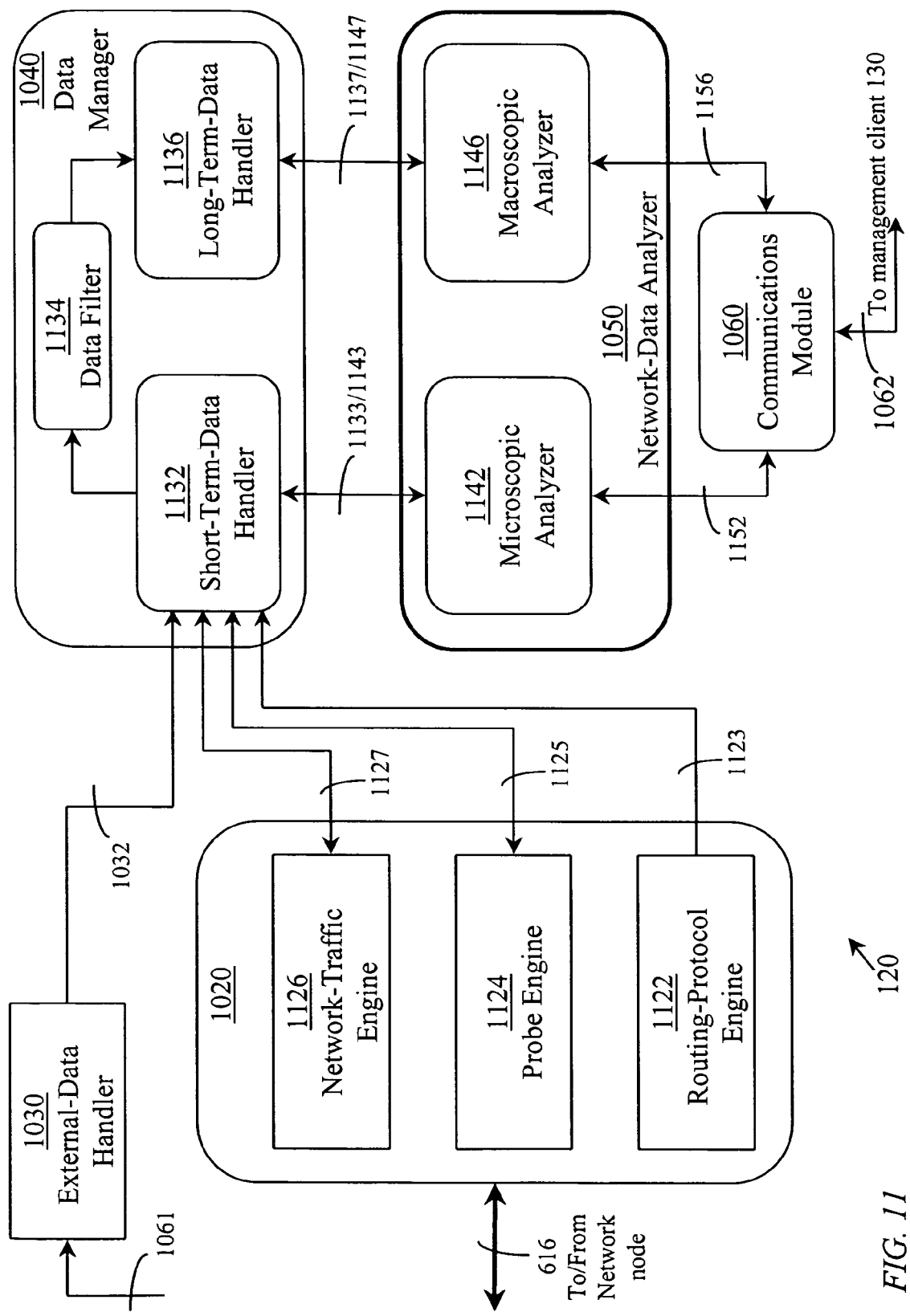
FIG. 11 details the network appliance of FIG. 10 illustrating constituent components of network-interface module, the data manager, and the network-data analyzer.

FIG. 11 provides further details of the main components of FIG. 10.

Network-Interface Module

The network-interface module 1020 comprises a routing-protocol engine 1122, a probe engine 1124, and a network-traffic engine 1126. The routing-protocol engine 1122 executes selected network routing protocols, such as the commonly used protocols known as "Open-Shortest-Path First" (OSPF), "Intermediate-System-to-Intermediate System" (ISIS), and the Border-Gate-Protocol (BGP). The OSPF and ISIS are known as "link-state" protocols because each participating node communicates the state of its links to neighbouring nodes. A node executing BGP retrieves routing information through a "peering process" with other nodes employing BGP. The probe engine 1124 injects probing packets to obtain performance measurements such as data loss and delay variations. The probe engine of the present invention implements efficient and precise methods with appropriate sampling rate to reduce the overhead of probing packets. The network-traffic engine 1126 collects operational data from nodes 610 of the object network 680 using any of known network-management protocols, such the "Simple Network Management Protocol" (SNMP). SNMP facilitates retrieval of statistics related to various managed objects of a network. The network traffic engine 1126 implements algorithms devised to reduce sampling overhead. Engines 1122, 1124, and 1126 may be implemented with different processor units with well-defined interfaces to channels 1123, 1125, and 1127, respectively, connecting to the short-term data handler 1132. It is noted that channels 1123, 1125, and 1127 collectively correspond to link 1022 of FIG. 10.

External-Data Handler

The external-data handler 1030 acquires static network data such as data identifying the topology of the installed object network 680. The external-data handler 1030 may also acquire link traffic data of the object network 680 using known tools such as the Multi-Router Traffic Grapher, and event data from available tools such as the Network-Management System, the Operational-Support System, and the Intrusion-Detection System. The data acquired by external-traffic handler 1030 may be used together with the real-time topological and operational data acquired by the network-interface module 1020 for analysis and visualization purposes.

Data Manager

The data manager 1040 comprises a "short-term data handler" 1132 for organizing short-term data, and a "long-term data handler" 1136 for aggregating data needed to develop a long-term view of the object network 680. The long-term data handler 1136 derives its data from the short-term data handler 1132 by means of a data filter 1134, which is primarily a software-based module that may be embedded in the short-term data handler 1132 or the long-term data handler 1136. The short-term data handler 1132 maintains and continuously updates a current replica of routing databases of some or all of the nodes 610 and organizes the data into a hierarchical data structure which enable fast retrieval and fast processing. The long-term data handler 1136 maintains, and periodically updates, tables containing routing-protocol data as well as link-capacity ("often called link-bandwidth") data.

Network-Data Analyzer

The network-data analyzer 1050 comprises a microscopic analyzer 1142, operating in "real-time", and a macroscopic analyzer 1146, for subsequent analysis of aggregated operational data. The short-term data handler 1132 exchanges data with the microscopic analyzer 1142 over physical (or logical) paths 1133/1143. The long-term data handler 1136 exchanges data with the macroscopic analyzer 1146 over physical (or logical) paths 1137/1147. It is noted that paths 1133, 1143, 1137, and 1147 collectively correspond to dual link 1045 of FIG. 10.

The analysis of the aggregated data may be carried out "off-line" using external computation facilities. For example, the network-data analyzer 1050 may export object-network data in response to demand, or by means of "SNMP-Traps", to proprietary applications residing on some external equipment.

The microscopic analyzer 1142 receives, from the short-term data handler 1132, routing data and other operational data, detects and records connection problems, and sends alarms to management clients 130 where required. The macroscopic analyzer 1146 may respond to queries from the management devices 130, communicated through the communications module 1060, which may require executing analytical procedures, and manages a "Long-Term Data Store". The microscopic analyzer 1142 and the macroscopic analyzer 1146 communicate with the management clients 130 over dual channels 1152 and 1156, respectively (dual channels 1152 and 1156 constitute dual link 1055 of FIG. 10). Details of the microscopic analyzer 1142 are described below with reference to FIGS. 12-15 and details of the macroscopic analyzer are described with reference to FIGS. 16 and 17.

Microscopic Analyzer

Figure 12:
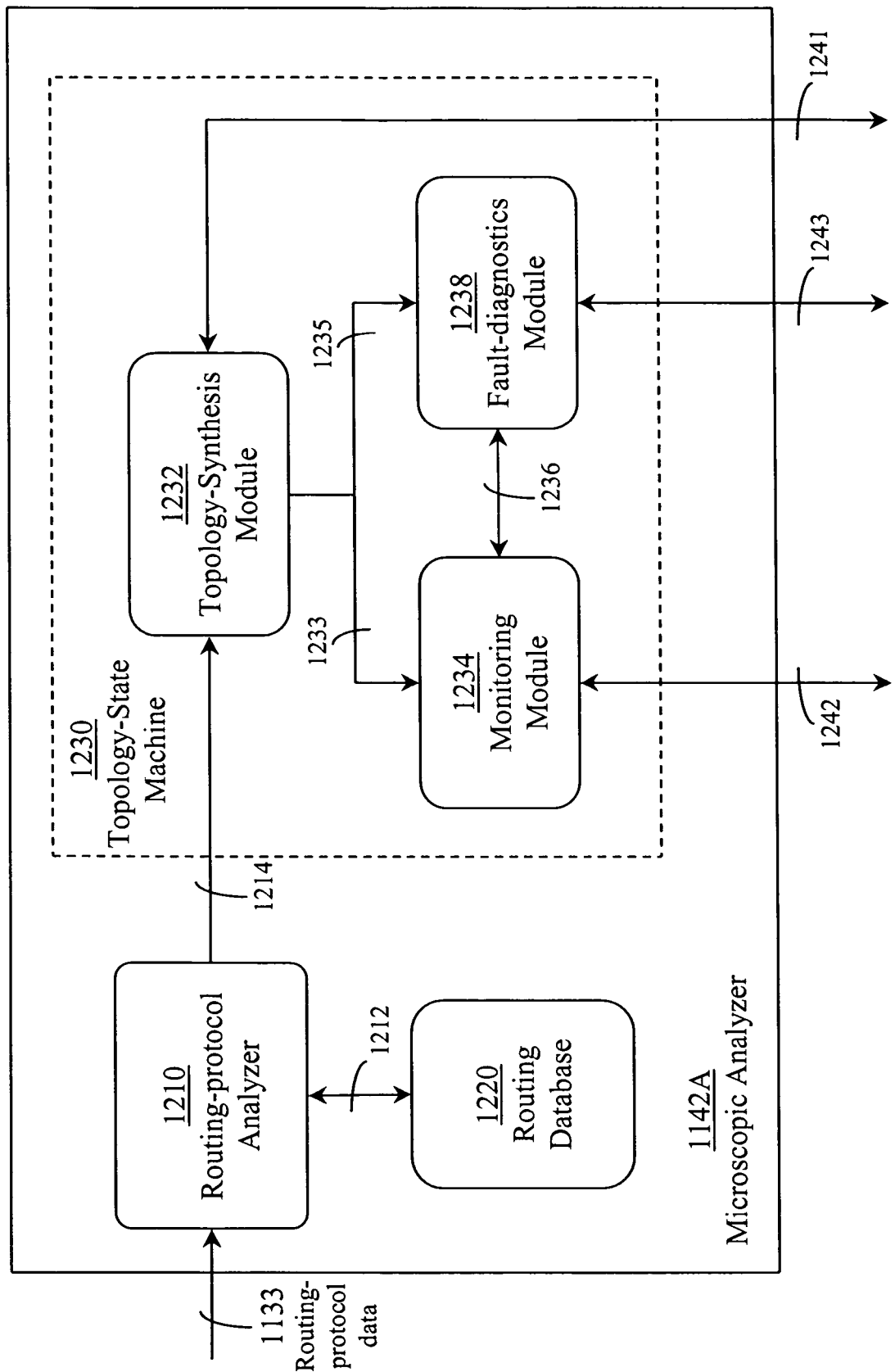
FIG. 12 illustrates a first microscopic analyzer associated with the network data analyzer of FIG. 10 in accordance with an embodiment of the present invention.

FIG. 12 illustrates a first exemplary implementation of the microscopic analyzer 1142, further identified as 1142A. A routing-protocol analyzer 1210 extracts protocol information from protocol data units received from the short-term data handler 1132 over path 1133 and interprets the protocol information as will be described with reference to FIG. 14. A topology-state machine 1230 processes the routing-protocol information and the network-management information to generate a current image of the object network 680. The topology state machine comprises a topology-synthesis module 1232 which uses routing-protocol information to deduce the connectivity of the object network 680, a monitoring module 1234 for monitoring network events and issuing alarms where necessary, and a fault-diagnostics module 1238 for determining a cause for an observed network problem. Modules 1232, 1234, and 1238 are mutually coupled as indicated by logical paths 1233, 1235, and 1236. The monitoring module 1234 and the fault-diagnostics module 1238 connect to a management client 130 through dual links 1242 and 1243, respectively. The topology-synthesis module 1232 connects to network-traffic engine 1126, long-term-data handler 1136, and a management client 130 through a shared dual link 1241.

Figure 13:
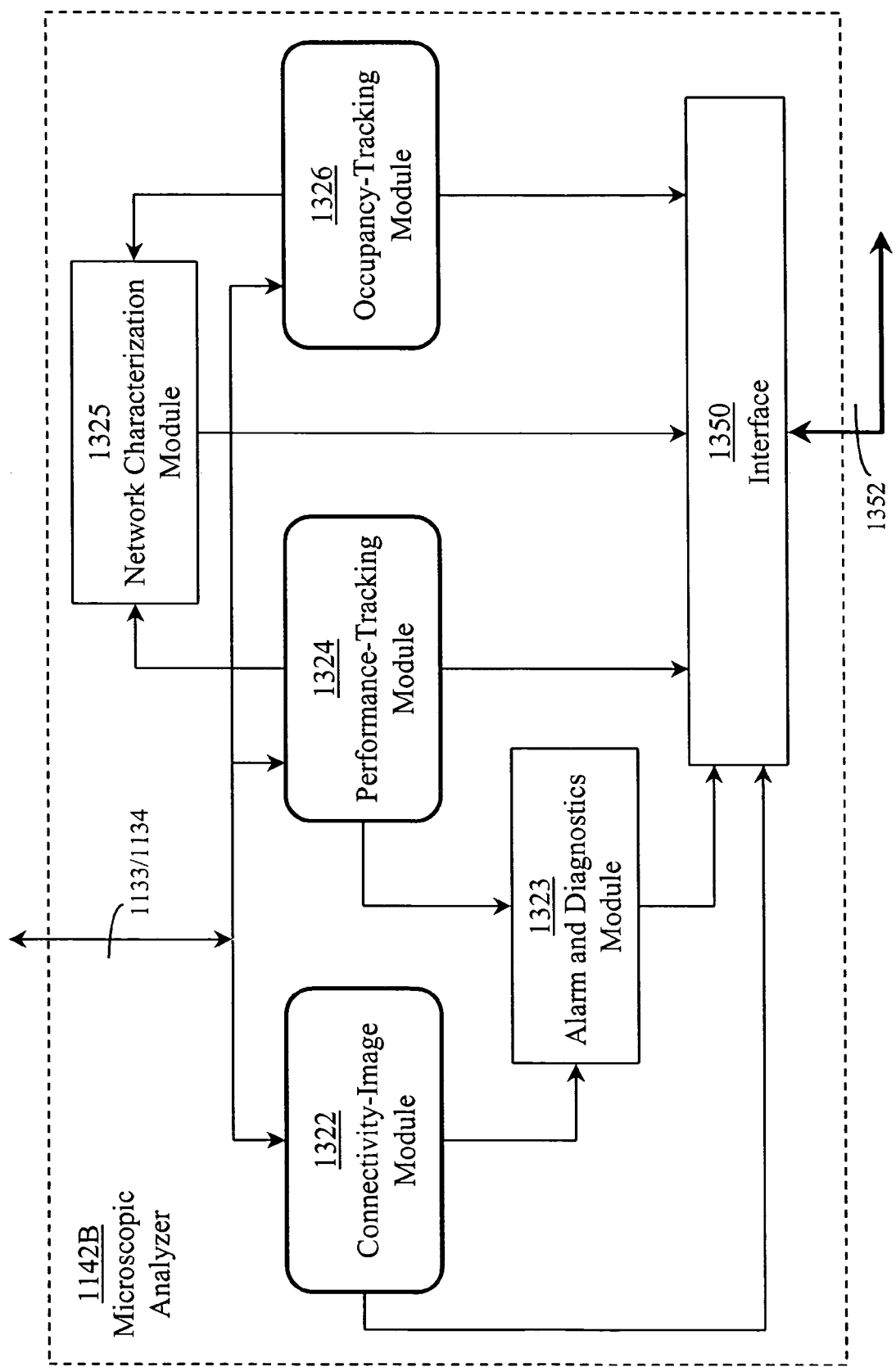
FIG. 13 illustrates a second microscopic analyzer associated with the network data analyzer of FIG. 10 in accordance with an embodiment of the present invention.

FIG. 13 illustrates a second exemplary implementation of the microscopic analyzer 1142, further identified as 1142B, comprising a connectivity-image module 1322, a performance-tracking module 1324, and an occupancy-tracking module 1326. Modules 1322, 1324, and 1326 receive information from the short-term data handler 1132 over dual link 1133/1143. An alarm-and-diagnostics module 1323 uses a current topology image of object network 680 (generated by the connectivity-image module 1322) and current operational data assembled by performance-tracking module 1324 to generate alarm data and diagnostic information to be transmitted to specific management clients 130. A network-characterization module 1325 uses current performance data assembled by performance-tracking module 1324 and current link-occupancy data assembled by an occupancy-tracking module 1326 to develop network metrics which may be considered in network-upgrade decisions. An interface 1350 selectively communicates various outputs to the management clients 130 over a dual link 1352.

Figure 14:
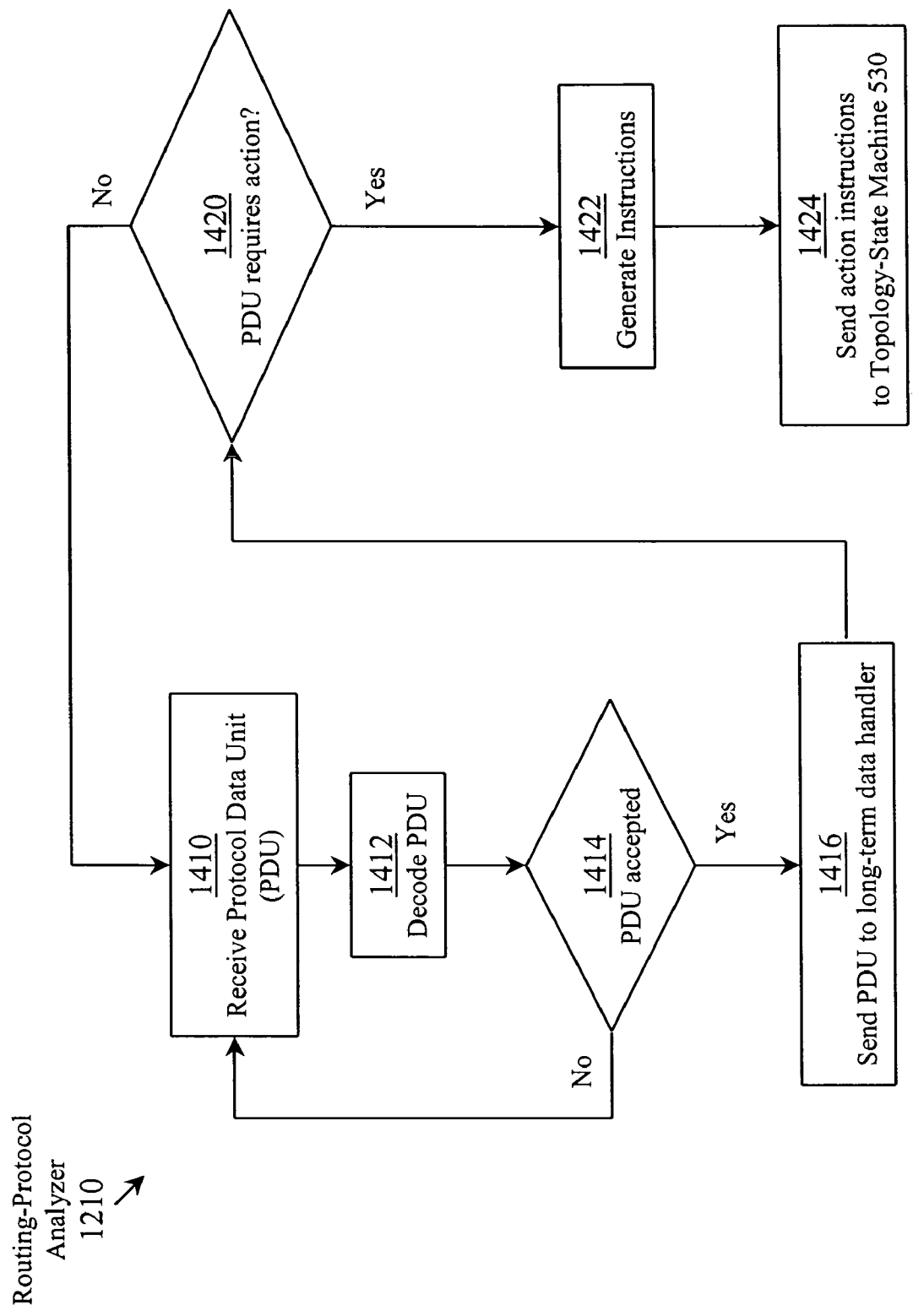
FIG. 14 is a flow chart summarizing the operation of a routing-protocol analyzer associated with the microscopic analyzer of FIG. 12.

Referring to FIG. 12, a protocol data unit received at the routing-protocol analyzer 1210 associated with microscopic analyzer 1142A is handled according to a process illustrated in the flow chart of FIG. 14. In step 1410, a protocol data unit (PDU) is received. The PDU is decoded in step 1412. If the PDU is not of interest, it is ignored and step 1414 directs the process to step 1410 to receive a new PDU. Notably, a PDU including a Link-State-Advertisement (LSA) other than an "AS-external LSA" is accepted. The acceptance of an AS-external LSA depends on user-defined criteria. Otherwise, if the received PDU is of interest, as determined in step 1414, the PDU is sent to Long-Term-Data-Handler 1136 (step 1416). A PDU may convey passive information or requests for action. In step 1420, the purpose of the PDU is determined. If a received PDU is passive (providing information but not requesting action), its processing is considered complete and step 1420 directs the process to the initial step 1410 to consider a waiting PDU or await a new PDU. Otherwise, step 1420 directs the process to step 1422, which generates instructions to be sent to the topology-state machine 1230 (step 1424).

Figure 15:
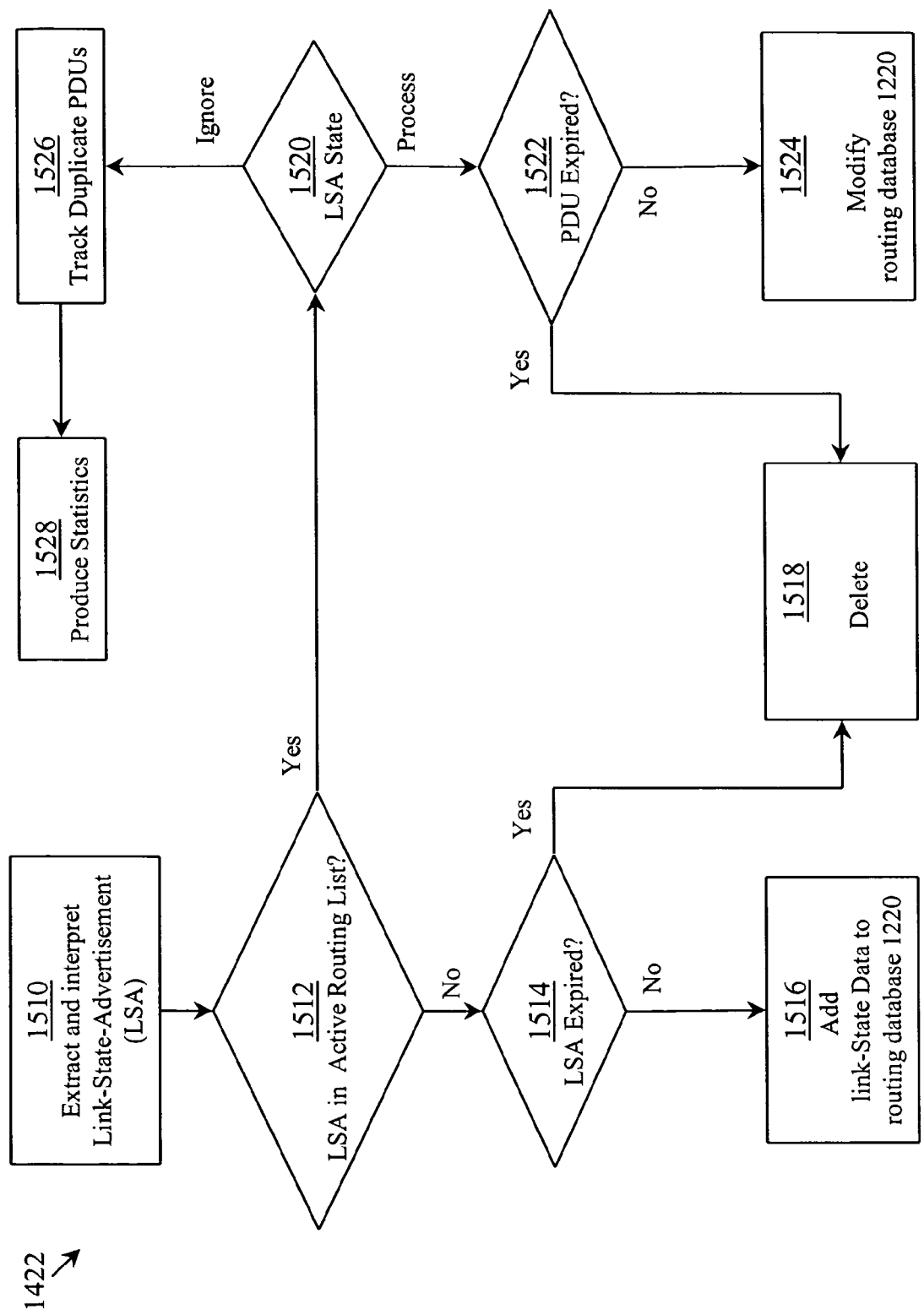
FIG. 15 is a flow chart indicating actions taken in processing a link-state advertisement of a protocol data unit received at the network appliance of FIG. 1.

The flow chart of FIG. 15 details an exemplary PDU processing in step 1422 (FIG. 14). The PDU considered in FIG. 15 belongs to a link-state routing protocol (such as OSPF or ISIS), which disseminates (broadcasts) link-states information. A link-state-advertisement (LSA) is extracted from a PDU and interpreted to determine its relevance and purpose. If the LSA is found in an Active-Routing List, as determined in step 1512, the LSA is examined in step 1520. Otherwise, if the LSA is not found in the Active-routing list, step 1514 determines if the LSA is current (did not expire). If the LSA is current, the LSA data is added to the link-state data in routing database 1220 (step 1516). If the PDU has expired, step 1514 directs the process to step 1518. If step 1520 determines that the LSA is intended to modify a previous version, the LSA is verified in step 1522 to determine if it is current. If the LSA is current, the routing database 1220 is modified in step 1524 according to the LSA content. If step 1522 determines that the PDU has expired, it directs the process to step 1518.

If an LSA is not intended to modify a previous version, step 1520 directs the process to step 1526 which tracks duplicate PDUs. Duplicate PDUs are discarded. However, statistical analysis related to duplicate PDUs may be carried out in step 1528.

Management Client

A management client 130 is an intermediary between the network appliance and a user (a network administrator). A management client 130 receives real-time and aggregated network information from the network appliance 120, as well as requests from a user as described above with reference to FIG. 5.

Figure 16:
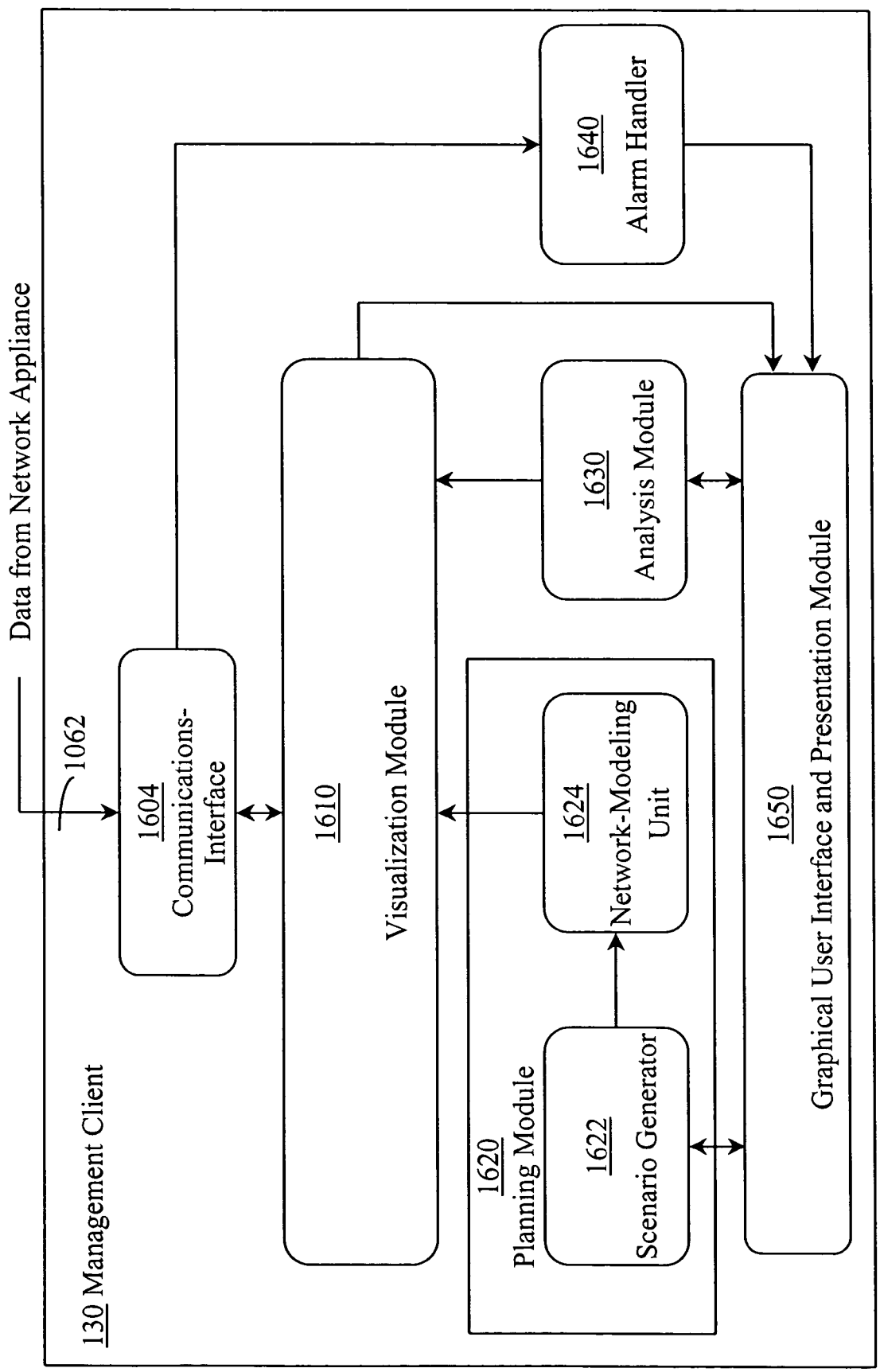
FIG. 16 illustrates a management client in the network of FIG. 1 according to an embodiment of the present invention.

FIG. 16 illustrates the main components of a management client 130 which include a visualization module 1610, a planning module 1620, an analysis module 1630, alarm handler 1640, and a graphical user interface 1650. A communications interface 1604 is communicatively coupled, either directly or through an external network, to communications module 1060 (FIG. 10) of network appliance 120 through a dual path 1062 as described above with reference to FIG. 10. Management client 130 receives connectivity and operational data from the network appliance 120 through communications module 1060 and interface 1604.

The visualization module 1610 supports a graph-theoretic algorithm, which portrays network connectivity and state in a clear representation. The algorithm is devised to minimize link-crossing to improve display clarity. Incremental network-layout changes are clearly identified. An incremental change may be an addition of a new node, a new link, or an increased capacity of an existing link.

The analysis module 1630 supports algorithms for network evaluation as will be described with reference to FIG. 18.

Resident Planning Module

Network analysis and planning have traditionally been based on past (stale) network data processed by means of stand-alone automated procedures. The drawbacks of such practice are well known. A significant advantage of the planning module 1620 over the prior art is that it is fully integrated in the network-analysis system 100 and can process fresh network data. This capability may be exploited to ensure the accuracy of underlying analytical or simulation methods as will be described below.

The resident planning module 1620 comprises a scenario generator 1622 and a network-modeling unit 1624 which implements a "network model" which comprises analytical models, simulation models, or combined analytical-simulation models. The scenario generator 1622 may generate variants of the network-image to be analyzed in network-modeling unit 1624, using respective analytical and/or simulation models. Planning module 1620 may operate in either of two modes: an analysis mode or a synthesis mode.

In the analysis mode, the performance of the object network 680 may be evaluated under various hypothetical conditions such as traffic-demand projections, connectivity changes, link-capacity changes, and different routing-protocols. The scenario generator 1622 may hypothesize potential nodal or link failure and modify the connectivity image of the object network 680 accordingly in order to analyze the network under component failure and ascertain network resilience (or otherwise). In the synthesis mode, the object network may be sized under hypothesized traffic loads, connectivity patterns, target performance levels, nodal or link-capacity constraints, and routing-protocol selections.

The graphical user interface 1650 acquires data from the network appliance 120 and produces a variety of presentations including a topology view, an alarm window, and performance metrics.

Figure 17:
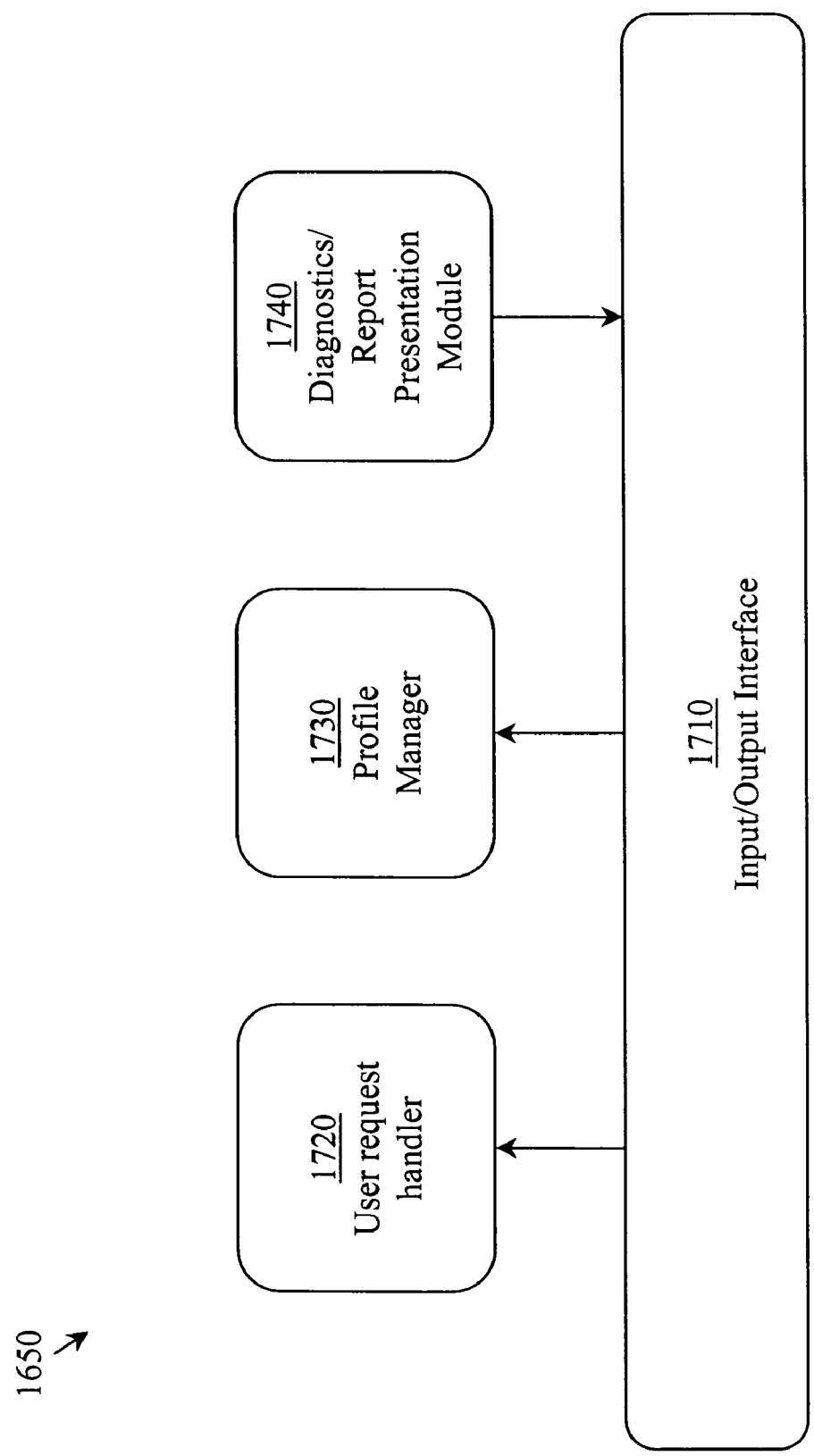
FIG. 17 illustrates a graphical user interface associated with the management client of FIG. 16.

FIG. 17 illustrates the graphical user interface 1650 which includes an input-output interface 1710, a user-request handler 1720, a profile manager 1730, and a diagnostic-report presentation module 1740. The user-request handler 1720 receives instructions from a user (a network administrator), validates the received instructions, and communicates with the analysis module 1630 and the planning module 1620. A management client 130 may support multiple users and the profile manager 1730 maintains a profile of each user. A user profile may include layout settings and connections to network-appliance parameters. The diagnostic-report presentation module 1740 acquires data from the network appliance and structures the data in a form suitable for visual display.

EXEMPLARY FEATURES OF THE RESIDENT PLANNING MODULE

FIG. 18 illustrates exemplary applications of the network-modeling unit 1624, of the resident planning module 1620, which may operate in an analysis mode or a synthesis mode.

In an analysis mode, a user may direct scenario generator 1622 to generate input, to the network-modeling unit 1624, which may include variants of traffic load, routing rules, inter-nodal connectivity, or link capacities, as illustrated in table 1810. The network-modeling unit 1624 processes the input to produce a detailed performance evaluation and overall performance metrics. The detailed performance evaluation may include end-to-end delay variation and/or data loss while the overall performance metric may include a mean value and standard deviation of delay variation and a mean value of data loss.

The network-modeling unit 1624 may also be used to study the sensitivity of the entire routing scheme to link failure. For example, based on user instruction, the scenario generator 1622 may artificially alter the connectivity image by deleting an entry corresponding to a given link from the data structure representing the connectivity image. The network-modeling unit 1624 then re-computes the inter-nodal routes and identifies any routing changes. In addition, the network-modeling unit determines performance changes due to the induced artificial failure. Furthermore, automated procedures may be introduced in the scenario generator for identifying critical links; a critical link may be common to numerous routes and its failure may cause routing instability. A network administrator may use such information to enhance the reliability of a critical link, or artificially increase its "link-cost index" in order to steer a respective route-computing algorithm to reduce the number of source-destination paths that traverse the link.

In a synthesis mode, a user may direct the scenario generator 1622 to produce variants of traffic load, routing rules, connectivity, acceptable performance indices, and any constraints that may limit the growth of a node's capacity or an individual-link's capacity, as illustrated in table 1820. The network-modeling unit 1624 processes the input to produce required link capacities, which may differ from their current values and hence may require some provisioning action.

Source-Destination Path Computation

The acquired data from the object network 680 may include a link-cost index for each link. The link-cost indices, together with current connectivity data and given rules of a predefined routing protocol, may be used to compute paths (routes) from each node to each other node within the object network. Software instructions for determining the paths may reside in the microscopic analyzer 1142 of network data analyzer 1050 (or its counterpart in the network-data analyzer 1950 of FIG. 19) in order to compute the paths under actual conditions of the object-network. The software instructions may also reside in the network modeling unit 1624 (FIG. 16) of any management client 130 in order to compute paths corresponding to hypothetical object-network variants.

Scalability of the Network-Analysis System

So far, the embodiments of the invention have been described with the help of an exemplary object network 80 (680) employing a network-analysis system 100 comprising a single network appliance 120. As the number of nodes 610 of the object network 680 increases, the network-analysis system 100 may be adapted to handle a potential increase in processing load which may require structural changes. Several measures may be taken to facilitate scalability, such as the use of multiple network-interface modules as described with reference to FIG. 19. Other measures may consider techniques of parallel processing, pipelining, etc.

Figure 19:
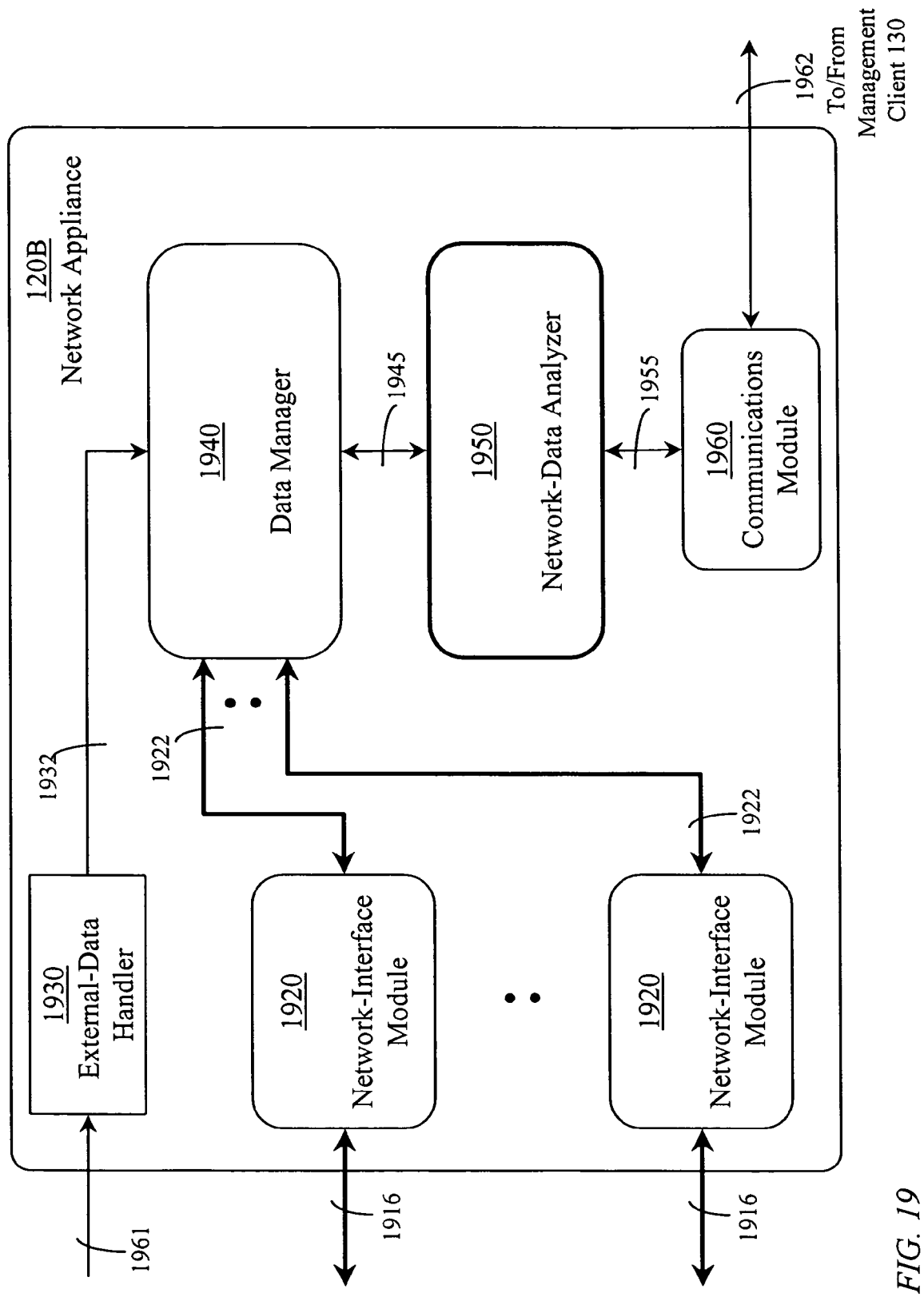
FIG. 19 illustrates an exemplary realization of a network appliance similar to the network appliance of FIG. 10 except that multiple network-interface modules may be used, in accordance with an embodiment of the present invention.

FIG. 19 illustrates an exemplary network appliance 120B adapted for a large-scale object network 80 having a large number of nodes. As in network appliance 120A of FIG. 10, network appliance 120B of FIG. 19 comprises a data manager 1940 (analogous to data manager 1040), a network-data analyzer 1950 (analogous to network-data analyzer 1050), and a communications module 1960 (analogous to communications module 1060). An external-data handler 1930 provides specific network-characterization data to network-data manager 1940. Network appliance 120B has multiple network-interface modules 1920 instead of the single network-interface module 1020 in the configuration of FIG. 10. Each network-interface module 1920 connects to a dual access port of large-scale object network 80. The dual access ports to which the network-interface modules 1920 connect preferably belong to different adjacent nodes of the large-scale object network 80. Links 1916, 1961, 1922, 1932, 1945, 1955, and 1962 in the configuration of FIG. 19 correspond to links 616, 1061, 1022, 1032, 1045, 1055, and 1062 of the configuration of FIG. 10.

The network-state data acquired by all network-interface modules 1920 are assembled and pre-processed in data manager 1940 for presentation to network-data analyzer 1950, which is the central component of the entire network-analysis system 100. It is noted that while multiple network-interface modules 1920 may be employed for network-data acquisition, the inter-dependence of network states necessitates that the object network 80 be analyzed or synthesized as a single integral system and, hence, a single network-data analyzer 1950 is used. The network-data analyzer 1950 may be structurally similar to network-data analyzer 1050 and comprise a microscopic analyzer and a macroscopic analyzer (not illustrated in FIG. 19). In a large-scale object network 80, network-data analyzer 1950 may require a high processing capacity. This may be realized by judicial division of some analytic functions, especially those performed by the time-constrained microscopic analyzer, into separable tasks that can be performed independently in a multi-processor environment.

Self-Verification

In a conventional network-design tool, a network is designed to meet specified performance indices. Traditional network-provisioning systems amount to a closed-loop delayed-control system with an inherently large internal delay. In a given network-provisioning phase, traffic-demand data is collected by one artifice or another over a period of time, desired changes in network connectivity and link capacities are determined and physically implemented, and the resulting performance is measured and used to determine the need, or otherwise, of a subsequent network-provisioning phase which would be based on new traffic-demand measurements. The delay between the stimulus (the implementation of physical network changes) and observed effect (resulting traffic performance) may be significantly large, thus reducing the effectiveness of the provisioning process. In addition, the delayed-control system does not permit reliable verification of the methods, analytical or otherwise, used in determining required network changes, simply because the performance is measured under a traffic load which may deviate significantly from the traffic load for which the network was provisioned.

The present invention remedies the shortcomings of the prior art and further provides a capability of self-verification of the analytical/simulation models used for network analysis and synthesis. The integrated real-time view of the object network covers current network connectivity, link-capacities, traffic-demand data, link-occupancy, and detailed performance measurements. The network connectivity, link capacities, and traffic-demand data may be processed, in an analysis mode, by the network-modeling unit 1624 to produce computed performance metrics and link-occupancy estimates. The sanity and accuracy of the analytical/simulation models may then be determined by comparing the computed results with the contemporaneous observed results. It is noted that the process of network synthesis is an inversion, explicit or implicit, of the network-analysis process and, hence, it suffices to verify the analysis-facet of the network-modeling unit 1624. The capability of self-verification of the underlying models of the planning module 1620 constitutes a significant advantage of the present invention over the prior-art.

Subset of the Network-Analysis System

The network-analysis system 100 integrates short-term and long-term aspects of network control and management. The network appliance 120 illustrated in FIG. 11 combines a microscopic analyzer 1142 and a macroscopic analyzer 1146 to provide both short-term and long-term aspects of network control and management. In some implementations, only the short-term aspects may be of interest, and, hence, the network appliance 120 may exclude the long-term data handier 1136, and, therefore, the macroscopic analyzer 1146 may not be required. Consequently, the management client 130 of FIG. 16 may exclude the planning module 1620. Conversely, the network-analysis system 100 may be primarily intended for use as a resident network-planning module 1620, in which case, some functions related to real-time monitoring may be excluded.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A network appliance for an object network having a plurality of nodes interconnected by a plurality of links and employing at least one routing protocol and at least one network-management protocol, the network appliance comprising:

a processor and a computer readable medium having computer readable instructions stored thereon, which, when executed by the processor, form the following modules:
a network-interface module for acquiring current protocol data from said object network;

a data manager for organizing and pre-processing said current protocol data; and a microscopic analyzer for processing said current protocol data to produce a current network image, said current network image comprising contemporaneous connectivity indicators, occupancy indicators, and performance indicators of said object network;

wherein said microscopic analyzer comprises:

a connectivity-image module for determining said connectivity indicators a performance-tracking module for determining said performance indicators;

an occupancy-tracking module for determining said occupancy indicators;

an alarm and diagnostics module computationally coupled to said connectivity-image module and said performance-tracking module for receiving alarms transmitted by said nodes of said object network and determining causes for said alarms; and a network-characterization module computationally coupled to said performance module and said occupancy-tracking module for determining metrics of said object network.

2. The network appliance of claim 1 wherein said data manager comprises:

a short-term data handler for organizing said current protocol data to produce structured current data;

a data filter computationally coupled to said short-term data handler for filtering the current data to produce aggregated data, and a long-term data handler for organizing said aggregated data to produce structured aggregated data.

3. The network appliance of claim 2 further comprising a macroscopic-analysis module for processing said aggregated data to produce network-planning information.

4. The network appliance of claim 3 further comprising a communications module for receiving requests from a plurality of network-management clients and sending responses to said network-management clients.

5. The network appliance of claim 1, wherein said network-interface module comprises:

a protocol engine for executing said at least one routing protocol;

an external data handler for acquiring network information provided by proprietary tools used in said object network;

a network-management engine for retrieval of operational data from said plurality of nodes using said at least one network-management protocol; and a probe engine for measuring network performance.

6. The network appliance of claim 1, wherein said microscopic analyzer comprises:

a topology-synthesis module for synthesizing a network image from said current protocol data;

a monitoring module for detecting link-state changes including link failure and link recovery; and a fault-diagnostics module for determining a cause of a link failure.

7. The network appliance of claim 1 wherein:

said at least one routing protocol includes at least one of the Open-Shortest-Path-First protocol, the intermediate-system-to-intermediate-system protocol, and the Border-Gate-Protocol; and said at least one network-management protocol includes the Simple-Network-Management-Protocol.

* * * * *